(12) United States Patent
Hong et al.

(10) Patent No.: US 10,084,615 B2
(45) Date of Patent: Sep. 25, 2018

(54) HANDOVER METHOD AND CONTROL TRANSFER METHOD

(71) Applicant: Electronics and Telecommunications Research Institute, Daejeon (KR)

(72) Inventors: Tae Chul Hong, Seoul (KR); Hee Wook Kim, Daejeon (KR); Kwang Jae Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/607,889

(22) Filed: May 30, 2017

(65) Prior Publication Data

US 2018/0139074 A1    May 17, 2018

(30) Foreign Application Priority Data

Nov. 14, 2016   (KR) .................. 10-2016-0150893
Dec. 21, 2016   (KR) .................. 10-2016-0175372

(51) Int. Cl.
*H04L 12/54*   (2013.01)
*H04W 36/08*   (2009.01)
(Continued)

(52) U.S. Cl.
CPC ............. *H04L 12/56* (2013.01); *H04W 36/08* (2013.01); *H04W 36/16* (2013.01); *H04W 36/28* (2013.01);
(Continued)

(58) Field of Classification Search
CPC ...... H04L 12/56; H04W 36/08; H04W 36/16; H04W 36/28; H04W 72/0406; H04W 84/045; H04W 36/10
See application file for complete search history.

(56) References Cited

U.S. PATENT DOCUMENTS 5,230,082 A * 7/1993 Ghisler ............. H04W 36/0055
                                                        455/438
5,915,221 A * 6/1999 Sawyer ............. H04W 36/0083
                                                        455/437

(Continued)

FOREIGN PATENT DOCUMENTS

EP        2978258 B1    3/2017
KR      101036100 B1    5/2011
(Continued)

*Primary Examiner* — Dinh P Nguyen
(74) *Attorney, Agent, or Firm* — William Park & Associates Ltd.

(57) ABSTRACT

A handover method and a control transfer method are provided. A handover method of performing an inter-cell handover between a first ground station and a second ground station may include setting a first channel to the second ground station, measuring, by an airborne radio station, a second channel and reporting a measurement result to the first ground station, sending, by the first ground station, a handover request to at least one of a ground control station (GCS) or a control and non-payload communication (CNPC) network, determining, by the at least one of the GCS or the CNPC network, whether to perform a handover, and transmitting, by the at least one of the GCS or the CNPC network, a handover instruction to the airborne radio station based on a result of the determining.

13 Claims, 14 Drawing Sheets

(51) Int. Cl.
*H04W 84/04* (2009.01)
*H04W 72/04* (2009.01)
*H04W 36/16* (2009.01)
*H04W 36/28* (2009.01)

(52) U.S. Cl.
CPC ..... *H04W 72/0406* (2013.01); *H04W 84/045* (2013.01)

(56) References Cited

U.S. PATENT DOCUMENTS

| | | |
|---|---|---|
| 9,497,683 B2 | 11/2016 | Park et al. |
| 2004/0185870 A1* | 9/2004 | Matsuda ............... G01S 5/0263 455/456.1 |
| 2005/0221824 A1* | 10/2005 | Lee .................. H04W 36/0066 455/435.2 |
| 2007/0010252 A1* | 1/2007 | Balachandran ... H04W 36/0033 455/437 |
| 2007/0161347 A1* | 7/2007 | Ma ..................... H04B 7/18506 455/11.1 |
| 2009/0047961 A1* | 2/2009 | Kim .................. H04W 36/0083 455/436 |
| 2010/0279702 A1* | 11/2010 | Kazmi ................. H04B 7/0817 455/452.2 |
| 2011/0014921 A1* | 1/2011 | Neil ..................... H04W 48/08 455/444 |
| 2014/0187247 A1* | 7/2014 | Sarkar ................... H04W 36/30 455/437 |
| 2014/0362717 A1* | 12/2014 | Koskinen ............. H04W 24/02 370/252 |
| 2016/0192358 A1 | 6/2016 | Lee et al. |

FOREIGN PATENT DOCUMENTS

| | | |
|---|---|---|
| KR | 101079655 B1 | 11/2011 |
| WO | 2016140410 A1 | 9/2016 |

* cited by examiner

HANDOVER METHOD AND CONTROL TRANSFER METHOD

CROSS-REFERENCE TO RELATED APPLICATIONS

This application claims the benefit of Korean Patent Application No. 10-2016-0150893, filed on Nov. 14, 2016, and Korean Patent Application No. 10-2016-0175372, filed on Dec. 21, 2016, in the Korean Intellectual Property Office, the disclosures of which are incorporated herein by reference.

BACKGROUND

1. Field of the Invention

At least one example embodiment relates to a method of performing a handover and a method of performing a control transfer.

2. Description of the Related Art

All components required for an entire flight process, including a control communication system, for example, takeoff/cruise, flight control, landing/retrieval, and the like, together with an unmanned aerial vehicle (UAV) (known as a pilotless aircraft or a drone) are exclusively referred to as an unmanned aircraft system (UAS) or a remotely piloted aircraft system (RPAS).

The UAS includes UAV ground control equipment, a UAV, and a data link. The data link refers to a wireless data link between a ground radio station (GRS) and the UAV, and may be broadly classified into a UAS ground control and non-payload communication (CNPC) data link and a UAS data link for tasks.

A data link for tasks is a link used to transfer data associated with performing of tasks, and is generally wideband in comparison to a CNPC data link. The CNPC data link is a link used to transfer data associated with UAV flight control, UAS state monitoring, and CNPC link management, and includes a pilot/air traffic control (ATC) relay link and a UAS control link. The pilot/ATC relay link is a communication link used to relay voice and data between a pilot and an ATC through the UAV, and the UAS control link is a link used to transfer control information associated with navigation safety between the pilot and the UAV. The UAS control link may be classified into a telecommand (TC) link and a telemetry (TM) link. The TC link is an uplink used to transfer flight orbit control information, all of UAV system control information required for safe flight, and the like, from a pilot on the ground to the UAV. The TM link is a downlink used to transfer a location, altitude and speed of the UAV, UAS operation mode and state, navigation aid data, tracking associated with detection and avoidance, a weather radar, video information, and the like, from the UAV to the pilot on the ground.

As a frequency for the UAV ground CNPC data link, a C band from 5030 megahertz (MHz) to 5091 MHz is generally considered. The C band is distributed as a new exclusive band in the World Radiocommunication Conference, 2012 (WRC-12). In addition, a band, for example, an L band from 960 MHz to 1164 MHz, distributed for an aeronautical mobile service may be considered, and a standard of the L band is prepared so that the L band is available for an aeronautical mobile service in the WRC-12. In the C band, a frequency jamming effect with an existing system and a multipath delay spread are relatively small. On the contrary, a directional antenna needs to be used to secure a link margin and a Doppler effect of the C band is great by five times in comparison to that of the L band. A low frequency band, for example the L band, distributed for an aeronautical mobile service is excellent in a propagation characteristic in comparison to the C band. The L band has a relatively low propagation loss of about 14 decibels (dB) in comparison to the C band. However, since existing navigation systems, for example, distance measurement equipment (DME), automatic dependent surveillance-broadcast (ADS-B), a tactical air navigation system (TACAN), and the like, are being operated in the confusion, it is difficult to secure a frequency and a great multipath delay spread occurs. Thus, the secured C band may be considered as a basic link of ground CNPC and a low frequency band (for example, the L band, an ultra high frequency (UHF), and the like) may be expected to be used to increase an availability of the CNPC data link for navigation safety of a UAV. Of course, the C band and the low frequency band may be used in reverse or used independently.

Connection types of the ground CNPC data link may include a point-to-point (P2P) type and a point-to-multipoint (P2MP) type. In the P2P type, a single GRS and a single unmanned aircraft (UA) form a data link. The P2P type is generally considered in an existing UAS. In the P2MP type, a single GRS and a plurality of UAs form a data link. Generally, in the P2MP type, GRSs are connected over a network, to support a GRS handover. In both the P2P type and P2MP type, GRSs may be connected over a network, and accordingly it is possible to provide a seamless UAV control communication service or to construct a single GRS. In the P2P type, a single GRS is generally constructed, and in the P2MP type, a network-based GRS is expected to be constructed. A network-based P2MP type capable of simultaneously forming a communication link with a plurality of UAVs and also forming a national network is expected to be considered as a next generation CNPC data link. Technology associated with such a P2MP UAS CNPC system has not been actively proposed.

Also, a CNPC channel needs to be assigned to operate an existing P2P UAS CNPC system. In an existing scheme, a spectrum authority statically assigns a channel during a relatively long period of time, for example, generally, 1 year or longer, when registering a UAS CNPC system. Thus, it is difficult to utilize a channel that is assigned to a specific UAS CNPC system at another UAS CNPC system.

Accordingly, there is an absolute need to operate a UAV CNPC system to efficiently utilize communication frequency resources that may control a plurality of UAVs to efficiently operate in a limited frequency band exclusive for controlling UAVs, in order to stably operate UAVs and expand a demand for UAVs.

SUMMARY

An aspect of at least one example embodiment is to provide a technology of designing and operating an unmanned aerial vehicle (UAV) control communication system that may efficiently operate a plurality of UAVs in a limited frequency band for controlling UAVs in order to stably operate UAVs and expand a demand for UAVs. Also, dynamical channel assignment and management may be necessarily required so that a spectrum authority may dynamically assign a frequency only when a UAV control and non-payload communication (CNPC) system operates, may retrieve the frequency immediately after the operation of the UAV CNPC system is completed and may reuse the frequency in another UAV CNPC system, while managing all frequencies in real time. Here, the SA may not statically assign a specific frequency to a specific CNPC system. The UAV CNPC system may need to support the dynamical channel assignment and management.

Another aspect of at least one example embodiment is to provide a method of performing a handover and a method of performing a control transfer in a communication system for controlling a UAV which are suitable for the above dynamical channel assignment and management. At least one example embodiment provides a method of performing a handover and a method of performing a control transfer based on a method of dynamically assigning and managing a channel in a spectrum authority.

According to an aspect, there is provided a handover method of performing an inter-cell handover between a first ground station and a second ground station. The handover method includes setting a first channel to the second ground station, measuring, by an airborne radio station, a second channel and reporting a measurement result to the first ground station, sending, by the first ground station, a handover request to at least one of a ground control station (GCS) or a CNPC network, determining, by the at least one of the GCS or the CNPC network, whether to perform a handover, and transmitting, by the at least one of the GCS or the CNPC network, a handover instruction to the airborne radio station based on a result of the determining.

The setting may include setting the first channel to the airborne radio station and the second ground station.

The measuring may include reporting the measurement result when a signal quality of the second channel is less than or equal to a reference value.

The transmitting of the handover instruction may include sending, by the at least one of the GCS or the CNPC network, a handover request to the second ground station based on the result of the determining, responding, by the second ground station, to the handover request, and transmitting, by the at least one of the GCS or the CNPC network, the handover instruction to the airborne radio station based on a response of the second ground station.

The sending of the handover request to the second ground station may include providing, by the at least one of the GCS or the CNPC network, security setting information that is to be used for a communication between the second ground station and the airborne radio station.

The handover method may further include performing the communication between the second ground station and the airborne radio station based on the security setting information.

The handover method may further include performing, by the airborne radio station, a handover to the first channel based on the handover instruction, and reporting a completion of the handover to the at least one of the GCS or the CNPC network.

The performing of the handover to the first channel may include transmitting, by the at least one of the GCS or the CNPC network, control communication data to the airborne radio station, and performing, by the airborne radio station, the handover to the first channel based on the control communication data.

The handover method may further include transmitting, by the at least one of the GCS or the CNPC network, information required for synchronization acquisition to the second ground station when the at least one of the GCS or the CNPC network sends the handover request to the second ground station, and performing, by the airborne radio station, a handover based on the information required for synchronization acquisition.

The handover method may further include transmitting, by the at least one of the GCS or the CNPC network to the airborne radio station, a measurement signal used to determine whether to perform a handover.

The measuring may include reporting the measurement result when a signal quality of each of the first channel and the second channel is greater than a signal quality of a currently used channel.

The transmitting of the measurement signal may include sending, by the at least one of the GCS or the CNPC network to the second ground station, a transmission (Tx) time determination request to determine a Tx time at which the measurement signal is to be transmitted, and determining, by the second ground station, a Tx of the measurement signal in response to the Tx time determination request.

The determining of the Tx of the measurement signal may include determining, by the second ground station, the Tx of the measurement signal based on downlink channel information of the airborne radio station.

The transmitting of the measurement signal may include sending, by the at least one of the GCS or the CNPC network to the airborne radio station, a Tx time determination request to determine a Tx time at which the measurement signal is to be transmitted, and determining, by the airborne radio station, a Tx of the measurement signal in response to the Tx time determination request.

The determining of the Tx of the measurement signal may include determining the Tx of the measurement signal based on global navigation satellite system (GNSS) position information of the airborne radio station or a received signal strength indicator (RSSI) of the first ground station.

According to another aspect, there is provided a control transfer method of performing a control transfer from a first GCS to a second GCS. The control transfer method includes setting a handover channel to a second ground station, measuring a currently used channel and reporting a measurement result, determining whether to perform a handover based on the measurement result, sending a handover request to the first GCS based on whether to perform the handover, determining, by the first GCS, whether to perform a control transfer in response to the handover request, sending, by the first GCS, a control transfer request to the second GCS based on whether to perform the control transfer, requesting, by the second GCS, the second ground station to prepare for a communication using the handover channel, in response to the control transfer request, transmitting, by the first GCS, a handover instruction to an airborne radio station when the second GCS notifies the first GCS of a start of the control transfer, and performing, by the airborne radio station, a handover to the handover channel in response to the handover instruction.

The measuring may include measuring, by the airborne radio station, the currently used channel and reporting the measurement result to a first ground station. The determining of whether to perform the handover based on the measurement result may include sending, by the first ground station, a handover request to the first GCS based on whether to perform the handover.

The measuring may include measuring, by the second ground station, the currently used channel and reporting a measurement result to the second GCS.

The control transfer method may further include sending, by the second GCS, a security setting information request to the airborne radio station, and responding, by the airborne radio station, to the security setting information request.

The sending of the security setting information request may include sending the security setting information request to the airborne radio station through the second ground station. The responding to the security setting information request may include responding to the security setting information request through the second ground station.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
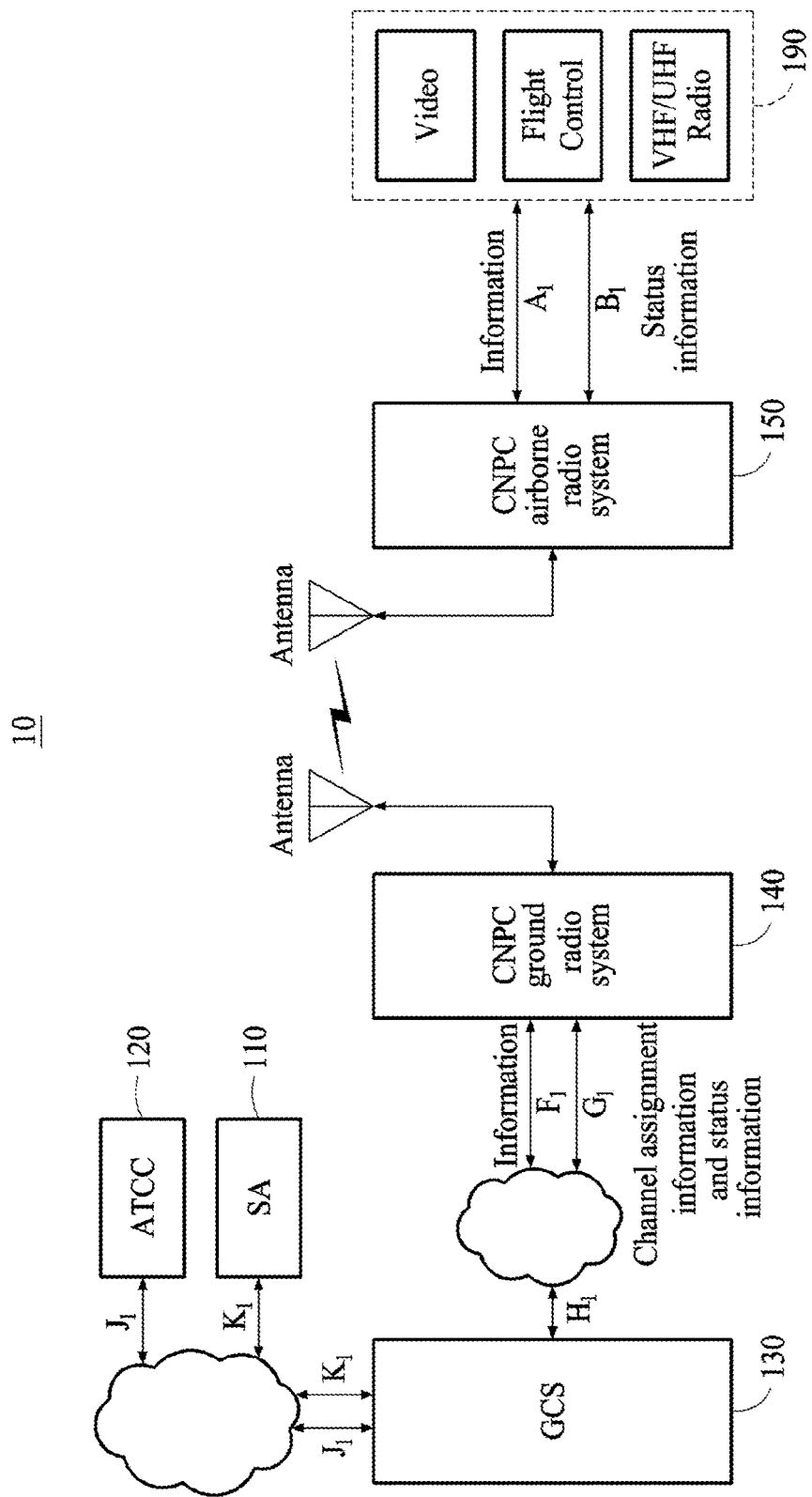
FIG. 1 is a diagram illustrating an example of information exchange and a relationship with neighboring systems for a stable operation of an unmanned aerial vehicle (UAV) in a UAV control and non-payload communication (CNPC) system according to an example embodiment.

The following structural or functional descriptions of example embodiments described herein are merely intended for the purpose of describing the example embodiments described herein and may be implemented in various forms. However, it should be understood that these example embodiments are not construed as limited to the illustrated forms.

Various modifications may be made to the example embodiments. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

FIG. 1 illustrates an example of information exchange and a relationship with neighboring systems for a stable operation of an unmanned aerial vehicle (UAV) in a UAV control and non-payload communication (CNPC) system 10 according to an example embodiment.

Referring to FIG. 1, the UAV CNPC system 10 may include a spectrum authority (hereinafter, referred to as an "SA") 110, an air traffic control center (ATCC) 120, a ground control station (GCS) 130, a CNPC ground radio system 140, and a CNPC airborne radio system 150.

The UAV CNPC system 10 may be a point-to-point (P2P) UAV CNPC system configured to control a UAV 190. The UAV 190 may include at least one of a video processor, a flight control processor or a very high frequency (VHF)/ultra high frequency (UHF) radio processor.

For an operation of the P2P UAV CNPC system, the GCS 130 may send a request for a channel to the SA 110 and the SA 110 may assign a channel to the GCS 130 in operation K1.

The GCS 130 may transmit ground/UAV CNPC radio channel assignment information and status information G1 and information F1 to the CNPC ground radio system 140 through a distribution system in operation H1. The information F1 may include UAV control data and communication data with the ATCC 120.

The CNPC ground radio system 140 may transfer information A1 to the flight control processor and VHF/UHF radio processor. The information A1 may include UAV control data and communication data with the ATCC 120, and accordingly may be substantially the same as the information F1. The UAV control data may include UAV telemetry and video data. Also, the CNPC ground radio system 140 may transfer CNPC airborne radio status information B1 to the flight control processor.

The CNPC airborne radio system 150 may transfer the information A1 to the CNPC ground radio system 140. The CNPC ground radio system 140 may transfer the information F1 received from the CNPC airborne radio system 150, the CNPC radio channel assignment information and status information G1 to the GCS 130 via a wired/wireless network in operation H1. A characteristic of the UAV CNPC system 10 will be described below.

Hereinafter, a link configuration for an operation of the UAV CNPC system 10 will be described.

1) The UAV CNPC system 10 may include a plurality of pairs of ground stations and airborne radio stations, and each of the ground stations and each of the airborne radio stations may form a one-to-one communication link.

2) When the UAV CNPC system 10 is a standalone system, the UAV CNPC system 10 may expand a coverage by a handover and control transfer of a ground radio station (GRS) of a GCS.

3) The UAV CNPC system 10 may implement a frequency-division multiple access (FDMA)-based ground station, to support a plurality of P2P UAVs in a single ground station.

Hereinafter, configurations for operations of an uplink channel and a downlink channel of the UAV CNPC system 10 will be described.

1) The UAV CNPC system 10 may operate through an FDMA channel in an uplink from a ground station to an airborne radio station and a downlink from the airborne radio station to the ground station.

2) The UAV CNPC system 10 may simultaneously support transmission (Tx) and reception (Rx) in a dual band channel (for example, an L band and a C band).

3) The UAV CNPC system 10 may support four data classes (DC1) with a plurality of channel bandwidths (for example, 30 kilohertz (kHz), 60 kHz, 90 kHz and 120 kHz).

4) The UAV CNPC system 10 may support different numbers of channel bandwidths for each link direction and for each band.

5) The UAV CNPC system 10 may support DC1, DC2 or DC3 in the uplink, and may support DC1, DC2, DC3, DC4, DC5 or DC6 in the downlink.

6) The airborne radio station of the UAV CNPC system 10 may support simultaneous transmissions of two FDMA channels. For example, the two FDMA channels may be a single channel for controlling a UAV among DC1 through DC4, and a single channel for safety video among DC5 and DC6.

7) The UAV CNPC system 10 may operate in a fixed channel except a channel reassignment and handover.

Figure 2:
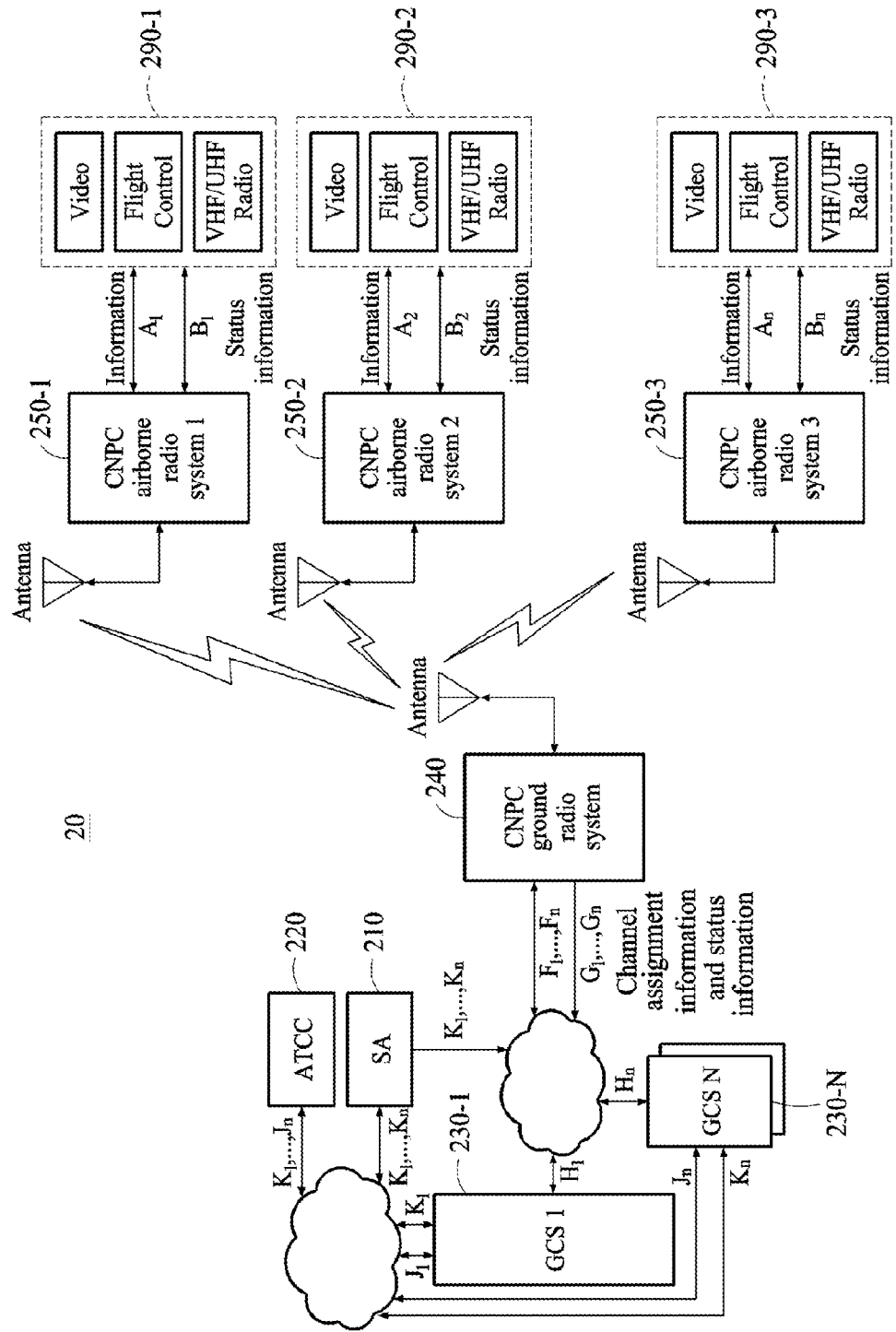
FIG. 2 is a diagram illustrating another example of information exchange and a relationship with neighboring systems for a stable operation of a UAV in a UAV CNPC system according to an example embodiment.

FIG. 2 illustrates another example of information exchange and a relationship with neighboring systems for a stable operation of a UAV in a UAV CNPC system 20 according to an example embodiment.

Referring to FIG. 2, the UAV CNPC system 20 may include a SA 210, an ATCC 220, GCSs 230-1 through 230-N, a CNPC ground radio system 240, and CNPC airborne radio systems 250-1 through 250-3. The UAV CNPC system 20 may be a point-to-multipoint (P2MP) UAV CNPC system configured to control UAVs 290-1 through 290-3. Each of the UAVs 290-1 through 290-3 may include at least one of a video processor, a flight control processor or a VHF/UHF radio processor.

Operations and configurations of the SA 210, the ATCC 220, the GCSs 230-1 through 230-N, the CNPC ground radio system 240, and the CNPC airborne radio systems 250-1 through 250-3 may be substantially the same as those of the SA 110, the ATCC 120, the GCS 130, the CNPC ground radio system 140, and the CNPC airborne radio system 150 of FIG. 1.

For convenience of description, three CNPC airborne radio systems, that is, the CNPC airborne radio systems 250-1 through 250-3 and three UAVs, that is, the UAVs 290-1 through 290-3 are shown in FIG. 2, however, there is no limitation thereto. For example, a plurality of CNPC airborne radio systems and a plurality of UAVs may be implemented.

For an operation of the P2MP UAV CNPC system, the GCSs 230-1 through 230-N may send a request for a channel to the SA 210, and the SA 210 may assign channels to the GCSs 230-1 through 230-N in operations K1 through Kn.

The GCSs 230-1 through 230-N may transmit information F1 that includes UAV control data and communication data with the ATCC 220 to the CNPC ground radio system 240 through a distribution system in operations H1 through Hn. The SA 210 may transmit UAV channel assignment information K1 through Kn to the CNPC ground radio system 240. The CNPC ground radio system 240 may transfer information A1 through An received from the GCSs 230-1 through 230-N to flight control processors and VHF/UHF radio processors of the UAVs 290-1 through 290-3 that are respectively controlled by the GCSs 230-1 through 230-N. The information A1 through An may include UAV control data and communication data with the ATCC 220, and accordingly may be substantially the same as the information F1 through Fn. The UAV control data may include UAV telemetry and video data. Also, the CNPC ground radio system 240 may transmit CNPC airborne radio status information B1 through Bn to the flight control processors.

The CNPC airborne radio systems 250-1 through 250-3 may relay the information A1 through An from the VHF/UHF radio processors to the CNPC ground radio system 240. The CNPC ground radio system 240 may transfer CNPC radio channel assignment information and status information G1 through Gn and the information F1 through Fn received from the CNPC airborne radio systems 250-1 through 250-3 to the GCSs 230-1 through 230-N in operations H1 through Hn.

A communication service for safe navigation control between the GCSs 230-1 through 230-N and the UAVs 290-1 through 290-3 provided by the UAV CNPC system 20 may vary depending on an uplink or a downlink. In the uplink, the communication service may include at least one of telecommand information, ATC relay information or NavAid setting information. In the downlink, the communication service may include at least one of telemetry information, ATC relay information, NavAid information, DAA target information, weather radar information, safety takeoff landing video information or emergency video information. The ATC relay information may include ATC audio and data relay information.

The UAV CNPC system 20 may define and provide various service classes to provide various services based on a channel capacity. The channel capacity may be a CNPC channel capacity for the UAVs 290-1 through 290-3.

For example, in the uplink, the CNPC airborne radio systems 250-1 through 250-3 may provide various service classes based on an assigned channel bandwidth or channel capacity by defining service classes as shown in Table 1 below. Also, in the downlink, the CNPC airborne radio systems 250-1 through 250-3 may provide various service classes based on an assigned channel bandwidth or channel capacity by defining service classes as shown in Table 2 below.

TABLE 1

|  | Service Class 1 | Service Class 2 | Service Class 3 |
|---|---|---|---|
| Telecommand | ○ | ○ | ○ |
| ATC Relay |  | ○ | ○ |
| NavAid Setting |  |  | ○ |

TABLE 2

|  | Service Class 1 | Service Class 2 | Service Class 3 | Service Class 4 | Service Class 5 | Service Class 6 |
|---|---|---|---|---|---|---|
| Telemetry | ○ | ○ | ○ | ○ |  |  |
| ATC Relay |  | ○ | ○ | ○ |  |  |
| NavAid |  |  | ○ | ○ |  |  |
| DAA Target |  |  | ○ | ○ |  |  |
| Weather Radar |  |  |  | ○ |  |  |
| Take-off landing video |  |  |  |  | ○ |  |
| Emergency video |  |  |  |  |  | ○ |

Services provided by the CNPC airborne radio systems 250-1 through 250-3 may necessarily include telecommand information (an uplink from a ground station to an airborne radio station) and telemetry information (a downlink from the airborne radio station to the ground station) in order to control the UAVs 290-1 through 290-3. In addition, based on a capacity of a GRS and a radio station included in a UAV and an assigned channel capacity or bandwidth, at least one of TC/TM data, ATC relay information, NavAid information, DAA target information, weather radar information or video information may be further included.

The CNPC airborne radio systems 250-1 through 250-3 may provide video services (for example, safe takeoff and landing video information and/or emergency video information) that may be considered for takeoff and landing and emergency, through a single band (for example, a C band for controlling a UAV) of a separate downlink channel. In other words, the CNPC airborne radio systems 250-1 through 250-3 may simultaneously transmit a single service class among service classes 1 through 4, and a single service class among service classes 5 and 6 for takeoff and landing or en-route emergency, through different channels in the C band.

The UAV CNPC system 20 may operate in a dual band to satisfy a link availability of 99.999%. For example, the CNPC airborne radio systems 250-1 through 250-3 may operate in a dual band of a C band and an L band assigned for control of a UAV. The UAV CNPC system 20 may transmit the same information or different information in the dual band. When the CNPC airborne radio systems 250-1 through 250-3 transmit the same information, a signal diversity gain between the C band and L band may be obtained in a physical layer. When the CNPC airborne radio systems 250-1 through 250-3 transmit different information, the SA 210 may assign different bandwidths to the C band and L band.

The C band may be a frequency band used exclusively for a UAV and a whole frequency band of 61 megahertz (MHz), and may be utilized for a UAV CNPC. For example, the CNPC airborne radio systems 250-1 through 250-3 may transmit, in the C band, at least one of TC/TM data, ATC relay information, DAA target information or weather radar information.

In the L band, an interference with another aeronautical radio device may occur. For example, the CNPC airborne radio systems 250-1 through 250-3 may transmit TC/TM data in the L band. A characteristic of the UAV CNPC system 20 will be described below. Hereinafter, a link configuration for an operation of the UAV CNPC system 20 will be described.

1) The UAV CNPC system 20 may include a plurality of ground stations to simultaneously support a plurality of airborne radio stations.

2) When the UAV CNPC system 20 is connected over a network, the UAV CNPC system 20 may expand a coverage by a handover between ground stations.

3) The UAV CNPC system 20 may implement a time-division multiplexing (TDM)-based ground station, to support a plurality of airborne radio stations in a single ground station.

Hereinafter, configurations for operations of an uplink channel and a downlink channel of the UAV CNPC system 20 will be described.

1) The UAV CNPC system 20 may operate through a TDM channel in an uplink from a ground station to an airborne radio station.

2) The UAV CNPC system 20 may assign different TDM time slots for each airborne radio station, and may distinguish the airborne radio stations based on the TDM time slots.

3) The UAV CNPC system 20 may fix and assign a channel bandwidth (a number of TDM time slots) and a frequency of a ground station. When long-term updating is performed, the UAV CNPC system 20 may change the number of TDM time slots.

4) The UAV CNPC system 20 may flexibly change a position and a number of time slots assigned to an airborne radio station that communicates with a corresponding ground station, to simultaneously support a plurality of airborne radio stations and efficiently support a channel change in a cell.

5) The UAV CNPC system 20 may operation through an FDMA channel in a downlink from an airborne radio station to a ground station.

6) The UAV CNPC system 20 may support simultaneous Tx and Rx in a dual band channel (for example, an L band and a C band).

7) The UAV CNPC system 20 may support a plurality of channel bandwidths (for example, eight channel bandwidths including 90 kHz, 180 kHz, 270 kHz, 360 kHz, 450 kHz, 540 kHz, 630 kHz and 720 kHz).

8) The UAV CNPC system 20 may support a number of TDM time slots determined based on an uplink channel bandwidth. For example, the UAV CNPC system 20 may support three time slots for 90 kHz, support six time slots for 180 kHz, and support 24 time slots for 720 kHz.

9) The UAV CNPC system 20 may support different numbers of channel bandwidths for each link direction and for each band. For example, the UAV CNPC system 20 may support 90 kHz, 180 kHz, 270 kHz, 360 kHz, 450 kHz, 540 kHz, 630 kHz and 720 kHz in the uplink, and support 30 kHz, 40 kHz, 90 kHz and 120 kHz in the downlink.

10) An airborne radio station of the UAV CNPC system 20 may support simultaneous transmissions of two FDMA channels. For example, the two FDMA channels may be a single channel for controlling a UAV among DC1 through DC4, and a single channel for safety video among DC5 and DC6.

11) The UAV CNPC system 20 may operate in a fixed channel except a channel reassignment and handover.

Hereinafter, a handover method and a control transfer method of the UAV CNPC system 10 or 20 will be described.

Figure 3:
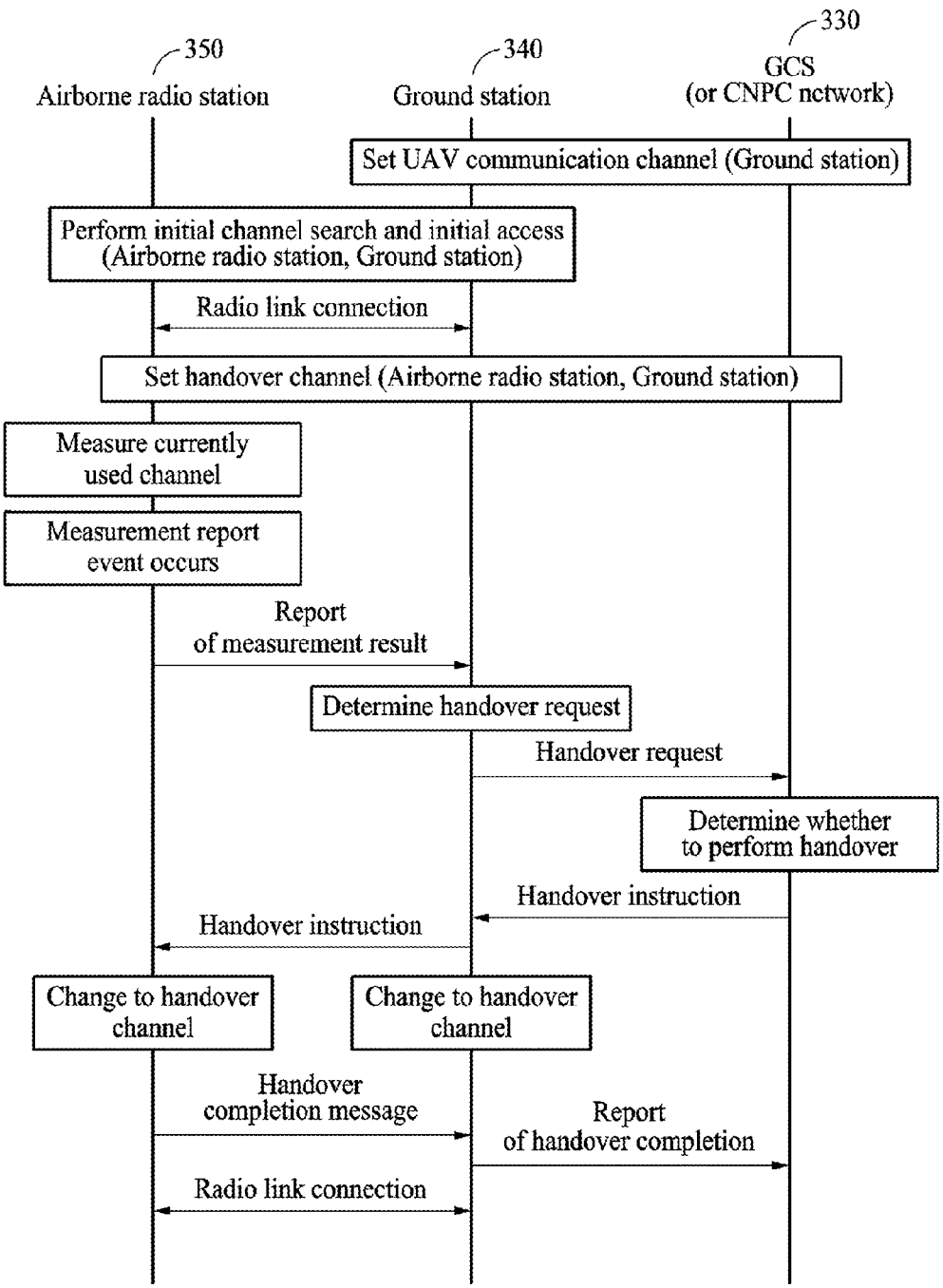
FIG. 3 is a diagram illustrating an example in which a UAV CNPC system performs a handover within the same cell according to an example embodiment.

FIG. 3 illustrates an example in which a UAV CNPC system performs a handover within the same cell according to an example embodiment.

Referring to FIG. 3, the UAV CNPC system may be implemented as the UAV CNPC system 10 of FIG. 1 or the UAV CNPC system 20 of FIG. 2. The UAV CNPC system may include a GCS or CNPC network 330, a ground station 340 and an airborne radio station 350. Configurations and operations of the GCS, the ground station 340 and the airborne radio station 350 may be substantially the same as those of the GCSs 130 and 230-1 through 230-N, the CNPC ground radio systems 140 and 240, and the CNPC airborne radio systems 150 and 250-1 through 250-3 which are shown in FIGS. 1 and 2. A CNPC network may be, for example, a communication network formed between the GCS 330 and the ground station 340. For example, the CNPC network may perform a handover based on an identity of each of the GCS 330 and the ground station 340.

The ground station 340 and the airborne radio station 350 may be connected to each other via a radio link through channel setting and initial access. The ground station 340 and the airborne radio station 350 may set a frequency for a handover and may set a handover channel for the handover. Here, when the ground station 340 and the airborne radio station 350 are connected via the radio link, the handover channel may be set.

When the UAV CNPC system performs a handover within the same cell, the airborne radio station 350 may measure a quality of a currently used channel, and the GCS or CNPC network 330 may determine whether to perform a handover based on the measured quality. The quality measured by the airborne radio station 350 may be based on a signal quality.

When the quality (for example, a signal quality) measured by the airborne radio station 350 is less than or equal to a predetermined threshold, the airborne radio station 350 may report a measurement result to the ground station 340. Here, the airborne radio station 350 may periodically report the measurement result. For example, the airborne radio station 350 may report the measurement result to the ground station 340 based on a predetermined period. Also, the airborne radio station 350 may be set to periodically report the measurement result to the ground station 340 when the quality is greater than the predetermined threshold.

The ground station 340 may send a handover request to the GCS or CNPC network 330 based on the measurement result.

In response to the handover request, the GCS or CNPC network 330 may determine whether to perform a handover. When the GCS or CNPC network 330 determines to perform the handover, the GCS or CNPC network 330 may transmit a handover instruction to the ground station 340.

In response to the handover instruction, the ground station 340 may transfer the handover instruction to the airborne radio station 350 and may change Tx and Rx settings for the handover channel.

In response to the handover instruction, the airborne radio station 350 may change Tx and Rx settings from the currently used channel to the handover channel. The airborne radio station 350 may transmit a handover completion message through the handover channel.

The ground station 340 may receive the handover completion message through a channel assigned for a handover. The ground station 340 may report a handover completion to the GCS or CNPC network 330, to complete a handover process.

To perform a UAV control communication in the UAV CNPC system, two channels, that is, a primary channel and a secondary channel may be assigned to the GCS or CNPC network 330 in a C band and an L band. The GCS or CNPC network 330 may determine whether to perform a handover based on a channel with a relatively low signal quality between the primary channel and the secondary channel.

Figure 4:
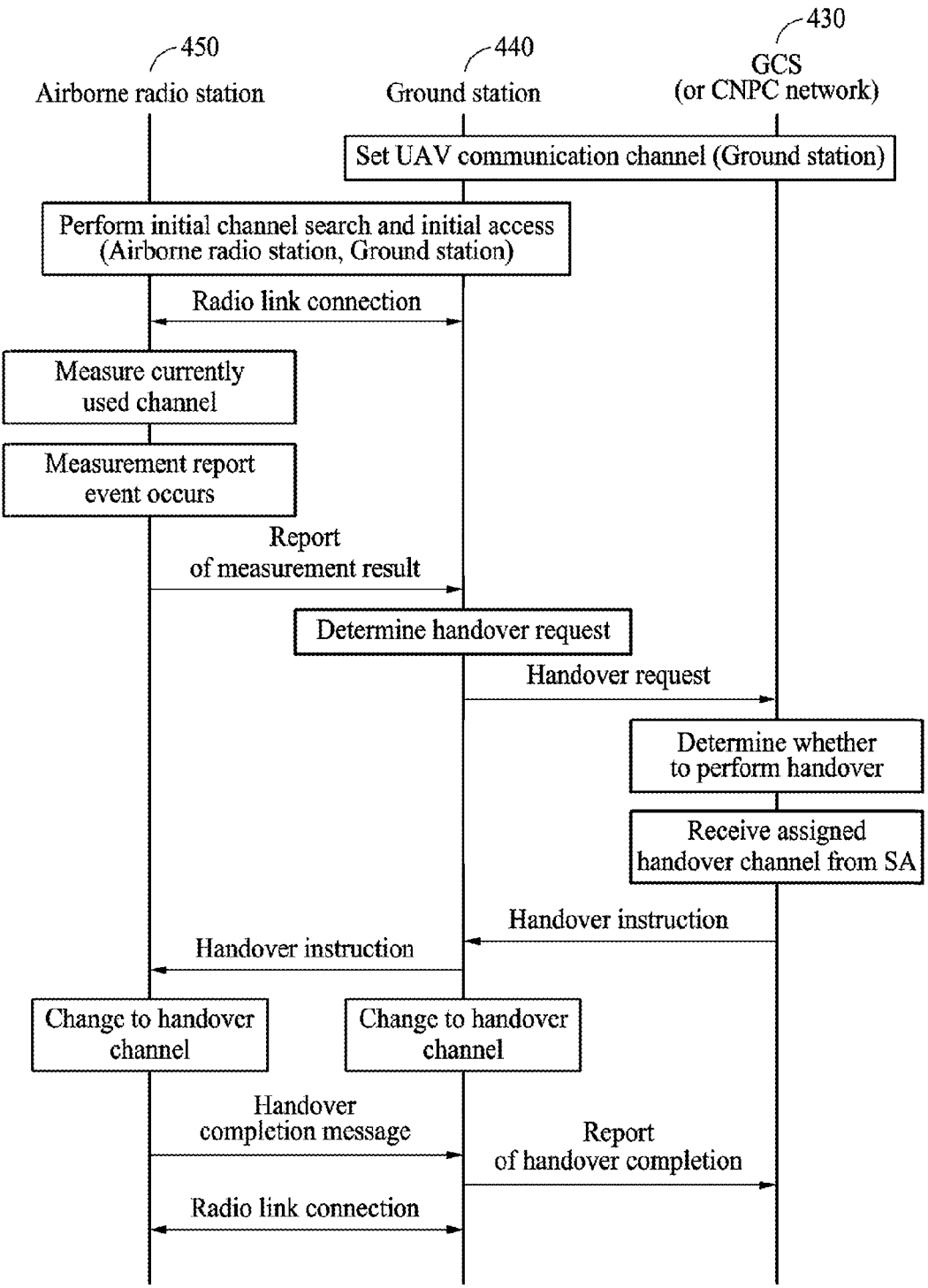
FIG. 4 is a diagram illustrating another example in which a UAV CNPC system performs a handover within the same cell according to an example embodiment.

FIG. 4 illustrates another example in which a UAV CNPC system performs a handover within the same cell according to an example embodiment.

Referring to FIG. 4, the UAV CNPC system may be implemented as the UAV CNPC system 10 of FIG. 1 or the UAV CNPC system 20 of FIG. 2. The UAV CNPC system may include a GCS or CNPC network 430, a ground station 440 and an airborne radio station 450. Configurations and operations of the GCS or CNPC network 430, the ground station 440 and the airborne radio station 450 may be substantially the same as those of the GCS or CNPC network 330, the ground station 340 and the airborne radio station 350 of FIG. 3.

The UAV CNPC system may replace or exchange one of two channels. For example, two channels, that is, a primary channel and a secondary channel may be assigned to the GCS or CNPC network 430, and the GCS or CNPC network 430 may simultaneously use the two channels for Tx and Rx, to perform a UAV control communication. In this example, when a status of one of the two channels is not good, a new channel, instead of the channel, may be assigned to the GCS or CNPC network 430 and the GCS or CNPC network 430 may perform a handover. When the ground station 440 sends a handover request to the GCS or CNPC network 430, the GCS or CNPC network 430 may receive an assigned handover channel and set the handover channel.

When the UAV CNPC system performs a handover within the same cell, the ground station 440 and the airborne radio station 450 may simultaneously change settings for a changed channel (for example, a handover channel) and may continue to perform a communication. Here, the ground station 440 may transfer, to the airborne radio station 450, a handover instruction together with information about a time at which a change to the handover channel is to be performed. Accordingly, the ground station 440 and the airborne radio station 450 may perform a communication through a change to the handover channel at the same time.

Figure 5:
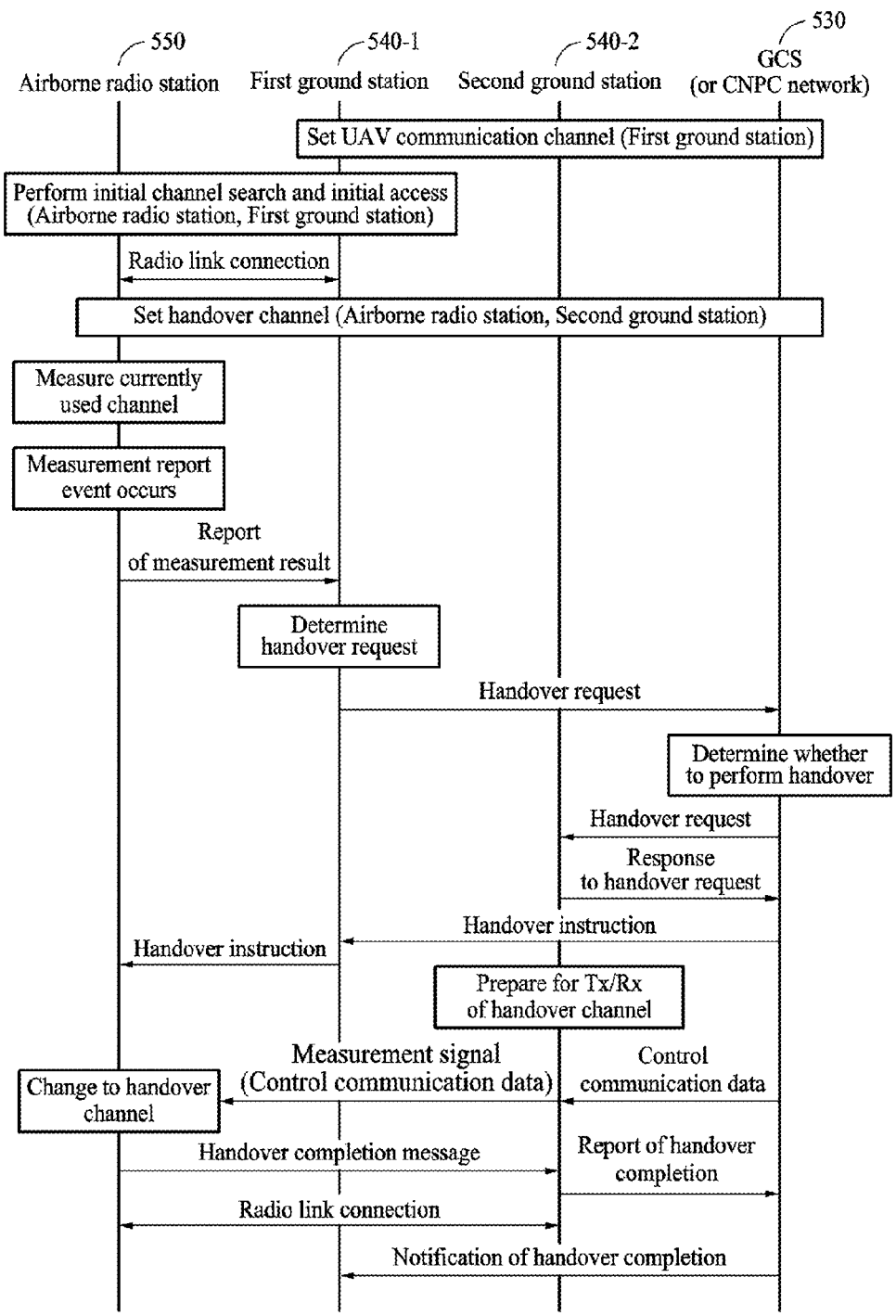
FIG. 5 is a diagram illustrating an example in which a UAV CNPC system performs an inter-cell handover according to an example embodiment.

FIG. 5 illustrates an example in which a UAV CNPC system performs an inter-cell handover according to an example embodiment.

Referring to FIG. 5, the UAV CNPC system may perform an inter-cell handover. The UAV CNPC system of FIG. 5 may include a GCS or a CNPC network 530, a first ground station 540-1, a second ground station 540-2 and an airborne radio station 550. Configurations and operations of the GCS 530, the first ground station 540-1, the second ground station 540-2 and the airborne radio station 550 may be substantially the same as those of the GCSs 130 and 230-1 through 230-N, the CNPC ground radio systems 140 and 240, and the CNPC airborne radio systems 150 and 250-1 through 250-3 which are shown in FIGS. 1 and 2. A CNPC network may be, for example, a communication network formed between the GCS 530, the first ground station 540-1 and the second ground station 540-2. For example, the CNPC network may perform a handover based on an identity of each of the GCS 530, the first ground station 540-1 and the second ground station 540-2.

The airborne radio station 550 and the first ground station 540-1 may be connected to each other via a radio link through channel setting and initial access. The airborne radio station 550 and the second ground station 540-2 may set a frequency for a handover and may set a handover channel.

The airborne radio station 550 may measure a quality of a currently used channel. The quality measured by the airborne radio station 550 may be based on a signal quality. For example, when a signal quality is less than or equal to a reference value, the airborne radio station 550 may report a measurement result to the first ground station 540-1. In this example, the airborne radio station 550 may periodically report the measurement result. The airborne radio station 550 may report the measurement result to the first ground station 540-1 based on a predetermined period. Also, the airborne radio station 550 may be set to periodically report the measurement result to the first ground station 540-1, when the signal quality is greater than or equal to the reference value.

The first ground station 540-1 may send a handover request to the GCS or CNPC network 530 based on the measurement result. In response to the handover request, the GCS or CNPC network 530 may determine whether to perform a handover. When the GCS or CNPC network 530 determines to perform the handover, the GCS or CNPC network 530 may send a handover request to the second ground station 540-2 and may receive a response to the handover request.

The GCS or CNPC network 530 may provide security setting information when sending the handover request to the second ground station 540-2. The security setting information may be, for example, information used in a communication between the airborne radio station 550 and the second ground station 540-2.

The second ground station 540-2 may prepare for a Tx and Rx of a handover channel. For example, the second ground station 540-2 may set the Tx and Rx of the handover channel, and may prepare for an Rx of a signal of the airborne radio station 550 and/or control communication data of the GCS or the CNPC network 530. When the control communication data is received from the GCS or CNPC network 530, the second ground station 540-2 may perform a Tx to the handover channel. The control communication data may be the same data as that transferred by the GCS or CNPC network 530 to the first ground station 540-1.

The GCS or CNPC network 530 may transfer a handover instruction to the first ground station 540-1, and the first ground station 540-1 may transfer the handover instruction to the airborne radio station 550. The handover instruction received by the airborne radio station 550 may include security setting information. The airborne radio station 550 may use the security setting information for a communication with the second ground station 540-2.

In response to the handover instruction, the airborne radio station 550 may perform a handover. In other words, the airborne radio station 550 may change a currently used channel to a handover channel. The airborne radio station 550 may transmit a handover completion message to the second ground station 540-2.

In response to the handover completion message, the second ground station 540-2 may report a handover completion to the GCS or CNPC network 530. The GCS or CNPC network 530 may notify the first ground station 540-1 of the handover completion, and the first ground station 540-1 may terminate a Tx and Rx of data with the airborne radio station 550.

Before the currently used channel is changed to the handover channel, the airborne radio station 550 may measure a signal received from the second ground station 540-2 during a predetermined period of time, and may acquire, in advance, information associated with synchronization acquisition, for example, an automatic gain control (AGC), a time offset or frequency offset. Here, when the airborne radio station 550 changes the currently used channel to the handover channel and connects a radio link, the information associated with synchronization acquisition may be used to acquire synchronization.

When the GCS or CNPC network 530 sends a handover request to the second ground station 540-2, the airborne radio station 550 may transmit information about the currently used channel. Accordingly, the second ground station 540-2 may perform an Rx using a currently used channel of the airborne radio station 550 and may acquire, in advance, information required for synchronization acquisition.

The first ground station 540-1 and the second ground station 540-2 may transmit the same data to the airborne radio station 550. Also, the first ground station 540-1 and the second ground station 540-2 may receive messages from the airborne radio station 550 at all times. Accordingly, data transmitted and received between the GCS or CNPC network 530 and the airborne radio station 550 may not be lost regardless of a point in time at which the airborne radio station 550 changes a channel for a handover.

Figure 6:
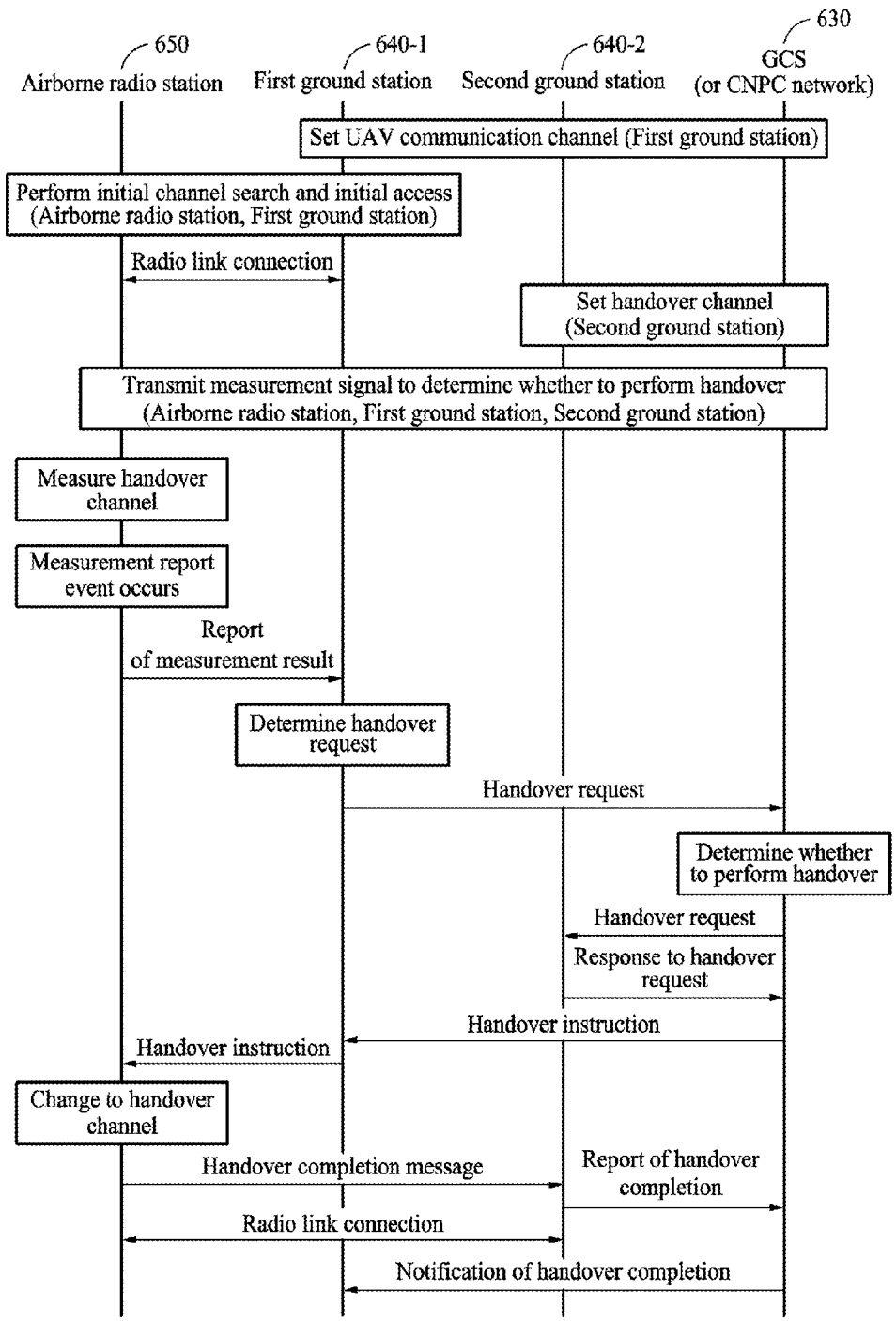
FIG. 6 is a diagram illustrating another example in which a UAV CNPC system performs an inter-cell handover according to an example embodiment.

FIG. 6 illustrates another example in which a UAV CNPC system performs an inter-cell handover according to an example embodiment.

Referring to FIG. 6, the UAV CNPC system performs an inter-cell handover. The UAV CNPC system of FIG. 6 includes a GCS or CNPC network 630, a first ground station 640-1, a second ground station 640-2 and an airborne radio station 650. Configurations and operations of the GCS 630, the first ground station 640-1, the second ground station 640-2 and the airborne radio station 650 may be substantially the same as those of the GCSs 130 and 230-1 through 230-N, the CNPC ground radio systems 140 and 240, and the CNPC airborne radio systems 150 and 250-1 through 250-3 which are shown in FIGS. 1 and 2. A CNPC network may be, for example, a communication network formed between the GCS 630, the first ground station 640-1 and the second ground station 640-2. For example, the CNPC network may perform a handover based on an identity of each of the GCS 630, the first ground station 640-1 and the second ground station 640-2.

Initially, only the second ground station 640-2 in the UAV CNPC system may set a handover channel. Here, to determine whether to perform a handover, the second ground station 640-2 may transmit a measurement signal to the GCS or CNPC network 630, the first ground station 640-1 and the airborne radio station 650. An example in which the second ground station 640-2 transmits the measurement signal will be described with reference to FIGS. 7 and 8 below.

The airborne radio station 650 may measure a quality of a handover channel and may compare the quality of the handover channel to a quality of a currently used channel. When the quality of the handover channel is greater than or equal to a reference value in comparison to the currently used channel, the airborne radio station 650 may report a measurement result to the first ground station 640-1. In an example, the airborne radio station 650 may periodically report the measurement result, as described above in FIG. 3. In another example, when the quality of the handover channel is greater than or equal to the reference value, the airborne radio station 650 may periodically report the measurement result. In still another example, when the quality of the handover channel is less than or equal to the reference value, the airborne radio station 650 may periodically report the measurement result.

The first ground station 640-1 may receive the measurement result and may operate as described above in FIG. 5. Also, the GCS or the CNPC network 630 may determine whether to perform a handover based on the measurement signal.

Figure 7:
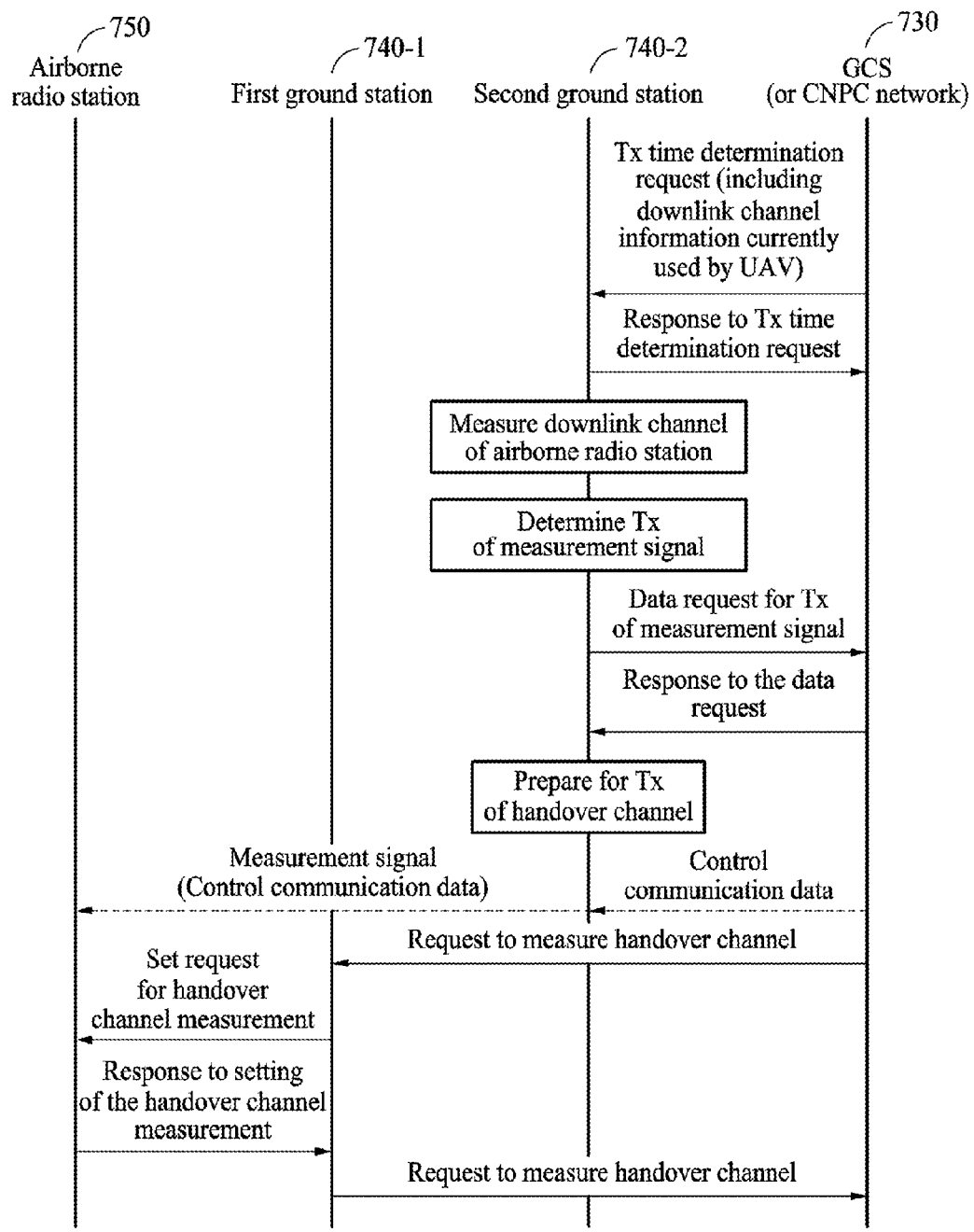
FIG. 7 is a diagram illustrating an example in which a second ground station transmits a measurement signal used to determine whether to perform a handover according to an example embodiment.

FIG. 7 illustrates an example in which a second ground station transmits a measurement signal used to determine whether to perform a handover according to an example embodiment.

Referring to FIG. 7, a UAV CNPC system may include a GCS or CNPC network 730, a first ground station 740-1, a second ground station 740-2 and an airborne radio station 750. Configurations and operations of the GCS or the CNPC network 730, the first ground station 740-1, the second ground station 740-2 and the airborne radio station 750 may be substantially the same as those of the GCS or CNPC network 630, the first ground station 640-1, the second ground station 640-2 and the airborne radio station 650 of FIG. 6.

The GCS or CNPC network 730 may send, to the second ground station 740-2, a request (hereinafter, referred to as a "Tx time determination request") to determine a Tx time at which a measurement signal is to be transmitted. Here, the GCS or CNPC network 730 may provide downlink channel information that is currently used by a UAV for a communication with the first ground station 740-1, together with the Tx time determination request.

The second ground station 740-2 may transmit a response to the Tx time determination request, and may measure a received signal strength indicator (RSSI) of a channel transmitted by the UAV based on the downlink channel information. When the RSSI is greater than or equal to a reference value, the second ground station 740-2 may determine a Tx of the measurement signal, and may send a data request for the Tx of the measurement signal to the GCS or CNPC network 730.

The GCS or CNPC network 730 may transmit, to the second ground station 740-2, a response to the data request and the same data as data transmitted to the first ground station 740-1.

When the response to the data request is received, the second ground station 740-2 may change Tx and Rx settings for a handover channel.

The GCS or CNPC network 730 may send a request to measure the handover channel, together with handover channel information, to the airborne radio station 750 through the first ground station 740-1. When a response to the request is received from the airborne radio station 750, the GCS or CNPC network 730 may complete the Tx of the measurement signal. The GCS or CNPC network 730 may receive the response to the request through the first ground station 740-1.

Data for the Tx of the measurement signal transmitted by the GCS or CNPC network 730 to the second ground station 740-2 may be the same data as data transmitted to the first ground station 740-1, or may be predefined data.

When the second ground station 740-2 uses predefined data as data for the Tx of the measurement signal, the second ground station 740-2 may not receive data for the Tx of the measurement signal from the GCS or CNPC network 730. Security may be applied to a radio link between the airborne radio station 750 and the first ground station 740-1 or the second ground station 740-2.

When the second ground station 740-2 uses the same data as data transmitted to the first ground station 740-1 as data for the Tx of the measurement signal, the second ground station 740-2 may receive a response to a request for the data together with security setting information from the GCS or CNPC network 730.

When a soft handover is considered, the second ground station 740-2 may receive the same setting information as security settings currently applied by the first ground station 740-1 and the airborne radio station 750 from the GCS or CNPC network 730, and may apply the setting information.

When a hard handover is considered, the second ground station 740-2 may receive security setting information that is to be used after a handover from the GCS or CNPC network 730, and may apply the security setting information.

The second ground station 740-2 may measure a channel that is being used by the airborne radio station 750 variously based on an antenna and radio frequency (RF) configuration. In an example, when a tracking antenna is used, the second ground station 740-2 may perform measurement in a direction that the first ground station 740-1 is located in a cell in which a UAV exists. In another example, when an omnidirectional antenna is used, the second ground station 740-2 may perform measurement without special settings. In still another example, when a sector antenna is used, the second ground station 740-2 may perform measurement for antennas that face a cell in which a UAV exists. In this example, the second ground station 740-2 may periodically perform measurement for the antennas. Here, when an RF configuration of the second ground station 740-2 supports measurements for a plurality of antennas all at once, the measurements for the antennas may be performed all at once.

The airborne radio station 750 may apply, to a receiver, information, for example, an AGC, a time offset or a frequency offset, acquired during measurement of a handover channel. For example, the airborne radio station 750 may apply the information to the receiver when changing a currently used channel to a handover channel. Accordingly, the airborne radio station 750 may acquire Rx synchronization.

The second ground station 740-2 may perform an Rx through the channel currently used by the airborne radio station 750 until a handover completion message is received from the airborne radio station 750 through the handover channel. When the airborne radio station 750 performs a handover, only a channel may be changed in the same band, for example, a C band or an L band, and information, for example, an AGC, a time offset or a frequency offset, acquired through the channel currently used by the airborne radio station 750 may be applied to an Rx of the handover channel, to acquire Rx synchronization.

Figure 8:
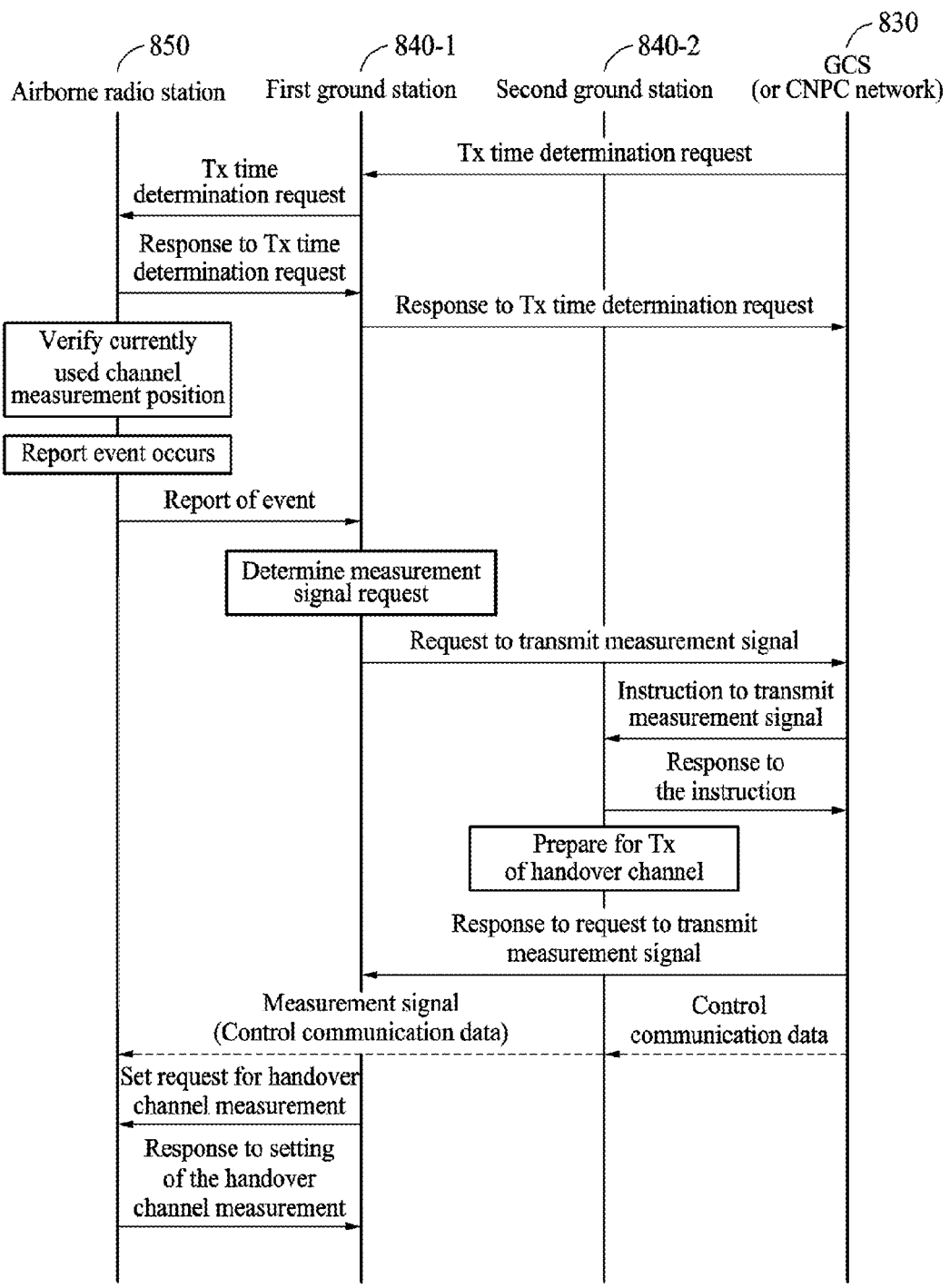
FIG. 8 is a diagram illustrating an example in which an airborne radio station transmits a measurement signal used to determine whether to perform a handover according to an example embodiment.

FIG. 8 illustrates an example in which an airborne radio station transmits a measurement signal used to determine whether to perform a handover according to an example embodiment.

Referring to FIG. 8, a UAV CNPC system includes a GCS or CNPC network 830, a first ground station 840-1, a second ground station 840-2 and an airborne radio station 850. Configurations and operations of the GCS or CNPC network 830, the first ground station 840-1, the second ground station 840-2 and the airborne radio station 850 may be substantially the same as those of the GCS or CNPC network 630, the first ground station 640-1, the second ground station 640-2 and the airborne radio station 650 of FIG. 6.

The GCS or CNPC network 830 may send a Tx time determination request to the airborne radio station 850. For example, the GCS or the CNPC network 830 may send the Tx time determination request to the airborne radio station 850 through the first ground station 840-1, and may receive a response to the Tx time determination request.

The airborne radio station 850 may determine a Tx time at which the measurement signal is to be transmitted, based on position information and/or status information of a currently used channel. The airborne radio station 850 may combine the status information and the position information and may determine the Tx time. The GCS or the CNPC network 830 may provide information about a scheme, a reference value, and the like that are used by the airborne radio station 850 to determine the Tx time. For example, the GCS or the CNPC network 830 may provide the information to the airborne radio station 850 when sending the Tx time determination request.

When an event that the measurement signal needs to be transmitted occurs, the airborne radio station 850 may report the event to the first ground station 840-1. In response to the reported event, the first ground station 840-1 may send, to the GCS or CNPC network 830, a request to transmit the measurement signal. The GCS or CNPC network 830 may transmit, to the second ground station 840-2, an instruction to transmit the measurement signal. When the GCS or CNPC network 830 receives a response to the instruction from the second ground station 840-2, the GCS or CNPC network 830 may transfer, to the second ground station 840-2, the same data as control data transferred to the first ground station 840-1. When a respond to the request to transmit the measurement signal is received from the GCS or the CNPC network 830, the first ground station 840-1 may send a set request for measurement of a handover channel to the airborne radio station 850. In response to the set request, the airborne radio station 850 may measure the handover channel.

Data for a Tx of the measurement signal transmitted by the GCS or the CNPC network 830 to the second ground station 840-2 may be the same data as data transmitted to the first ground station 840-1, or may be predefined data, as described above.

When the second ground station 840-2 uses predefined data as data for the Tx of the measurement signal, the second ground station 840-2 may not receive data for the Tx of the measurement signal from the GCS or the CNPC network 830. Security may be applied to a radio link between the airborne radio station 850 and the first ground station 840-1 or the second ground station 840-2.

When the second ground station 840-2 uses the same data as data transmitted to the first ground station 840-1 as data for the Tx of the measurement signal, the second ground station 840-2 may receive a measurement signal Tx instruction together with security setting information from the GCS or the CNPC network 830.

When a soft handover is considered, the second ground station 840-2 may receive the same setting information as security settings currently applied by the first ground station 840-1 and the airborne radio station 850 from the GCS or the CNPC network 830, and may apply the setting information.

When a hard handover is considered, the second ground station 840-2 may receive security setting information that is to be used after a handover from the GCS or CNPC network 830, and may apply the security setting information.

For convenience of description, the second ground station 740-2 of FIG. 7 or the airborne radio station 850 of FIG. 8 may be configured to determine the time at which the measurement signal is to be transmitted, however, there is no limitation thereto. Accordingly, when the GCS or CNPC network 730 or 830 sets a handover channel, a measurement signal may be transmitted directly to the airborne radio station 750 or 850.

Figure 9:
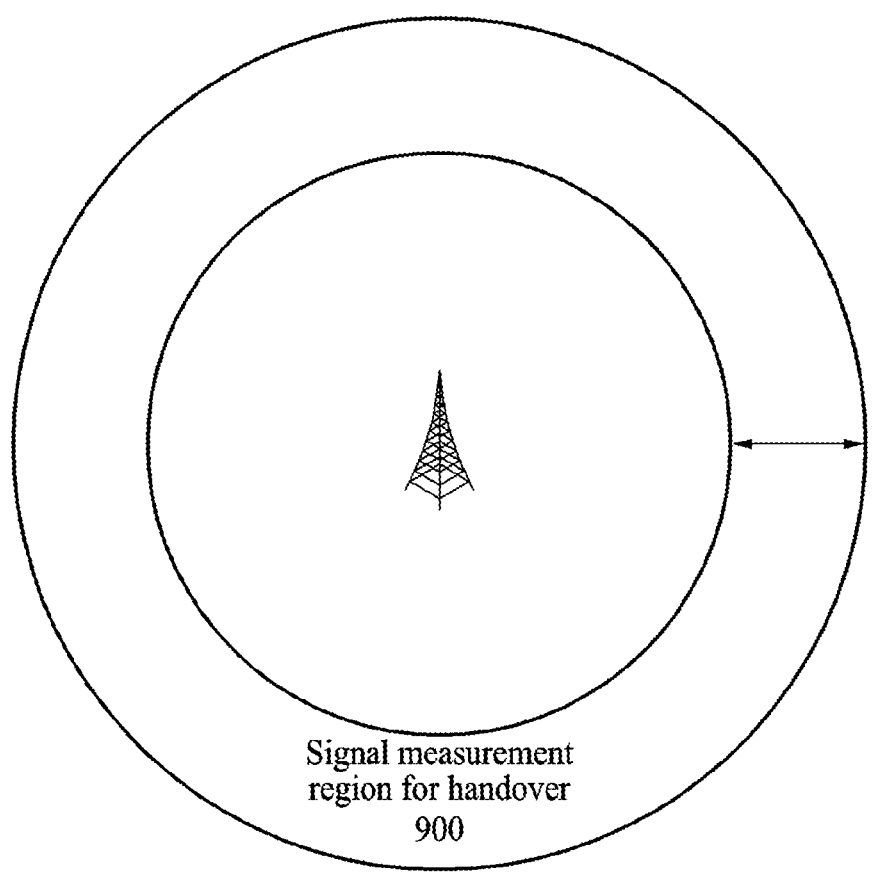
FIG. 9 is a diagram illustrating an example in which an airborne radio station of FIG. 8 determines a transmission time of a measurement signal to determine whether to perform a handover.

FIG. 9 illustrates an example in which the airborne radio station 850 of FIG. 8 determines a Tx time of a measurement signal to determine whether to perform a handover.

Referring to FIGS. 8 and 9, the airborne radio station 850 may utilize global navigation satellite system (GNSS) position information and/or an RSSI of the first ground station 840-1 or the second ground station 840-2 that is currently connected to the airborne radio station 850, to determine a Tx time at which the measurement signal is to be transmitted.

When the airborne radio station 850 uses the GNSS position information to determine the Tx time, the airborne radio station 850 may set a region 900 in advance. The region 900 may be a region in which measurement for a handover is started. When a UAV enters the region 900, the airborne radio station 850 may send, to the GCS or the CNPC network 830, a request to transmit the measurement signal.

When the airborne radio station 850 uses the RSSI to determine the Tx time, the airborne radio station 850 may monitor the RSSI. The RSSI may be an intensity of a signal received via a current communication. When the RSSI decreases to be less than or equal to a critical value (threshold), the airborne radio station 850 may determine a Tx of the measurement signal.

Figure 10:
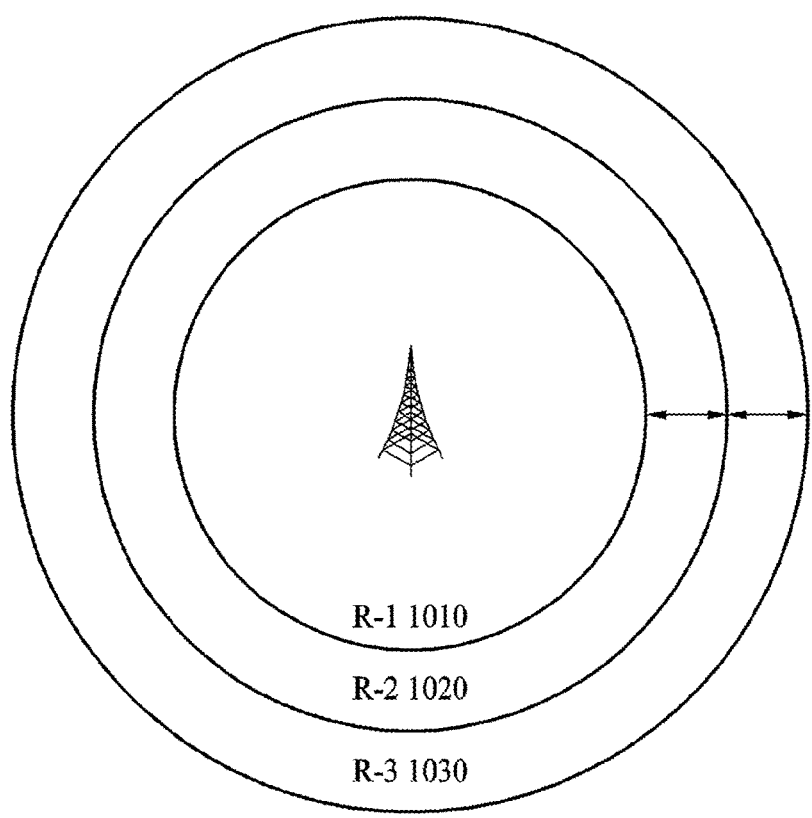
FIG. 10 is a diagram illustrating another example in which the airborne radio station of FIG. 8 determines a transmission time of a measurement signal to determine whether to perform a handover.
Figure 11:
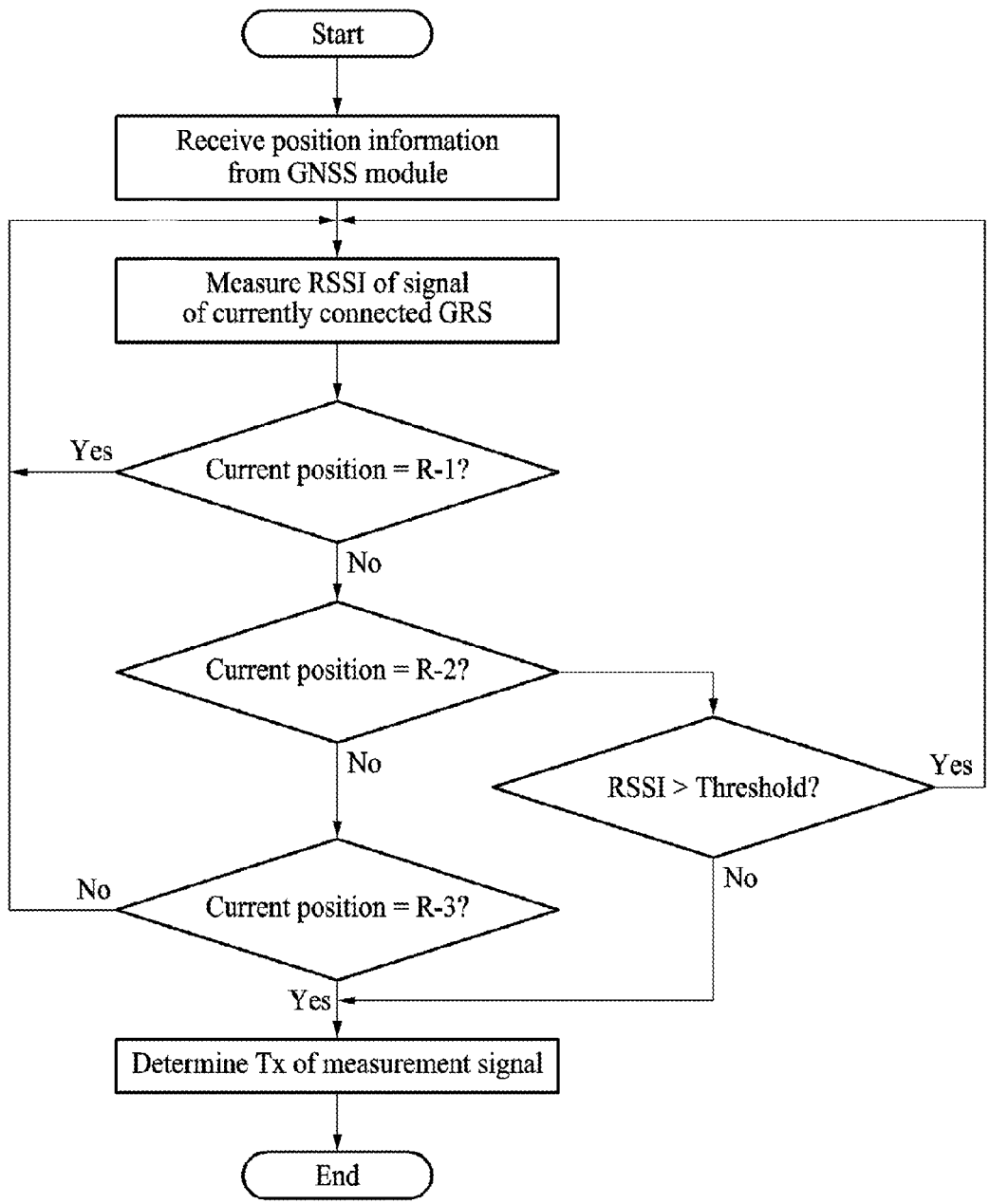
FIG. 11 is a diagram illustrating an example in which the airborne radio station of FIG. 8 determines a transmission of a measurement signal.

FIG. 10 illustrates another example in which the airborne radio station 850 of FIG. 8 determines a Tx time of a measurement signal to determine whether to perform a handover. FIG. 11 illustrates an example in which the airborne radio station 850 determines a Tx of a measurement signal.

Referring to FIGS. 8, 10 and 11, the airborne radio station 850 may determine a Tx time at which a measurement signal is to be transmitted based on GNSS position information and an RSSI of the first ground station 840-1 or the second ground station 840-2 that is currently connected to the airborne radio station 850. To use the GNSS position information and the RSSI, the airborne radio station 850 may divide a region into a region R-1 1010, a region R-2 1020 and a region R-3 1030.

The region R-1 1010 may be a region that is the closest to the first ground station 840-1 or the second ground station 840-2 that is currently connected to the airborne radio station 850 and in which a handover does not occur. For example, when a UAV is located in the region R-1 1010, the airborne radio station 850 may not take into consideration Tx of a measurement signal.

The region R-2 1020 may be a region in which a handover occurs depending on circumstances. For example, when a signal quality is relatively low due to topography, the airborne radio station 850 may perform a handover.

The region R-3 1030 may be a region that corresponds to the region 900 of FIG. 9. For example, when a UAV is located in the region R-3 1030, the airborne radio station 850 may request the GCS or the CNPC network 830 to transmit a measurement signal.

The airborne radio station 850 may determine the Tx of the measurement signal based on the GNSS position information and the RSSI.

The airborne radio station 850 may receive current GNSS position information from a GNSS module (not shown), and may receive an RSSI from the first ground station 840-1 or the second ground station 840-2 that is currently connected to the airborne radio station 850. The airborne radio station 850 may verify a position of a UAV based on the current GNSS position information.

The GNSS module may refer to hardware configured to perform an operation and function of measuring GNSS position information, refer to computer program code to perform a specific function and operation, or refer to an electronic recording medium (for example, a processor or a microprocessor) including computer program code to perform a specific function and operation. In other words, the GNSS module may refer to a functional and/or structural combination of hardware for performing an operation of measuring GNSS position information and/or software for driving hardware.

In an example, when a UAV is currently located in the region R-1 1010, the airborne radio station 850 may repeatedly receive GNSS position information and an RSSI. In other words, the GNSS module and the first ground station 840-1 or the second ground station 840-2 may continue to measure GNSS position information and an RSSI.

In another example, when a UAV is currently located in the region R-2 1020, the airborne radio station 850 may compare an RSSI to a threshold. When the RSSI is greater than the threshold, the GNSS position information and RSSI may be measured again. When the RSSI is less than the threshold, the airborne radio station 850 may determine a Tx of a measurement signal.

In still another example, when a UAV is currently located in the region R-3 1030, the airborne radio station 850 may determine a Tx of a measurement signal regardless of an RSSI.

Figure 12:
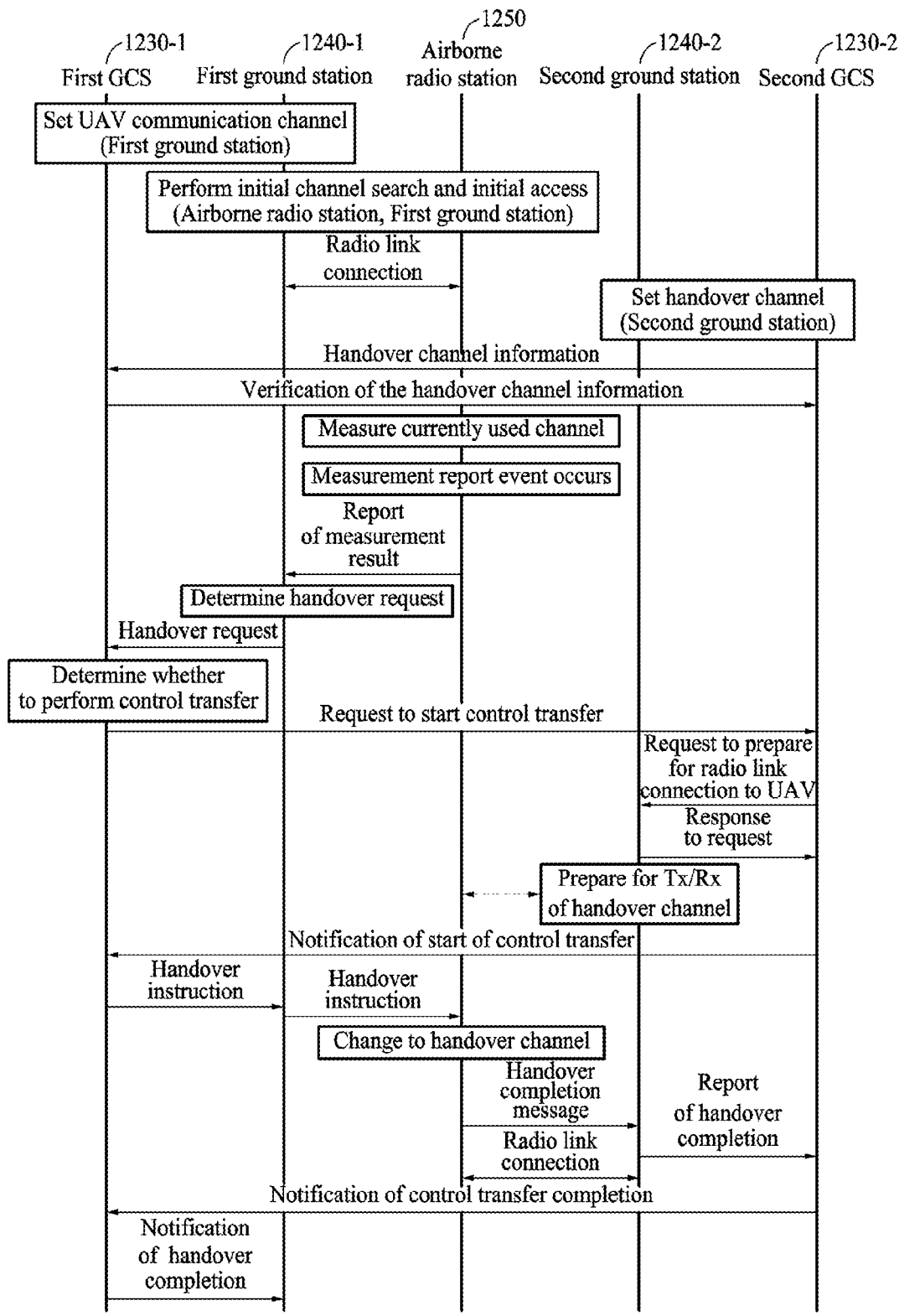
FIG. 12 is a diagram illustrating an example in which a ground control station (GCS) performs a control transfer according to an example embodiment.

FIG. 12 illustrates an example in which a GCS performs a control transfer according to an example embodiment.

Referring to FIG. 12, a UAV CNPC system may include a first GCS 1230-1, a second GCS 1230-2, a first ground station 1240-1, a second ground station 1240-2 and an airborne radio station 1250. Configurations and operations of the first GCS 1230-1, the second GCS 1230-2, the first ground station 1240-1, the second ground station 1240-2 and the airborne radio station 1250 may be substantially the same as those of the GCSs 130 and 230-1 through 230-N, the CNPC ground radio systems 140 and 240, and the CNPC airborne radio systems 150 and 250-1 through 250-3 which are shown in FIGS. 1 and 2.

The first GCS 1230-1 may send a channel request to an SA, and may receive an assigned channel from the SA. The first ground station 1240-1 and the airborne radio station 1250 may be connected using the assigned channel.

The second GCS 1230-2 may request the SA to assign a channel (hereinafter, referred to as a "control transfer channel") for a control transfer of a UAV, and may receive the assigned control transfer channel from the SA. The second GCS 1230-2 may set the control transfer channel to the second ground station 1240-2, and may provide the first GCS 1230-1 with information about the control transfer channel.

The airborne radio station 1250 may measure a channel currently used with the first ground station 1240-1. Here, when a signal quality of the currently used channel is less than or equal to a reference value, the airborne radio station 1250 may report a measurement result to the first ground station 1240-1.

In response to receiving the measurement result, the first ground station 1240-1 may send a handover request to the first GCS 1230-1. In response to the handover request, the first GCS 1230-1 may determine whether to perform a control transfer.

When the first GCS 1230-1 determines to perform the control transfer, the first GCS 1230-1 may send a request to start the control transfer to the second GCS 1230-2.

In response to the request to start the control transfer, the second GCS 1230-2 may send a request to prepare for a radio link connection to a UAV to the second ground station 1240-2, and may receive a response to the request from the second ground station 1240-2. Also, the second GCS 1230-2 may transfer a message indicating a start of a control transfer process to the first GCS 1230-1. The second ground station 1240-2 may perform Tx and Rx settings of a handover channel for a connection to the UAV, and may prepare for the radio link connection. In response to the message, the first GCS 1230-1 may transmit a handover instruction to the airborne radio station 1250 through the first ground station 1240-1.

The airborne radio station 1250 may perform a handover from the currently used channel to the handover channel, and may transmit a handover completion message to the second ground station 1240-2. The second ground station 1240-2 may report a completion of the handover to the second GCS 1230-2. The second GCS 1230-2 may transfer a control transfer completion message to the first GCS 1230-1. The first GCS 1230-1 may transfer a handover completion message to the first ground station 1240-1 and may terminate Tx and Rx with the airborne radio station 1250.

In the control transfer process, the first GCS 1230-1 may transfer, to the second GCS 1230-2, the request to start the control transfer, together with security-related setting information that is currently applied between the first ground station 1240-1 and the airborne radio station 1250.

The second GCS 1230-2 may update a security key based on the security-related setting information. The security key may be used for a radio link connection between the second ground station 1240-2 and the airborne radio station 1250. The second GCS 1230-2 may provide the second ground station 1240-2 with the updated security key together with a request to prepare for a radio link connection to the airborne radio station 1250. Also, when the second GCS 1230-2 notifies the first GCS 1230-1 of the start of the control transfer, security setting information that is to be used by the second ground station 1240-2 and the airborne radio station 1250 may be provided. The airborne radio station 1250 may set security based on the provided security setting information. The first GCS 1230-1 may include the security setting information in a handover instruction and may provide the handover instruction with the security setting information to the airborne radio station 1250.

Figure 13:
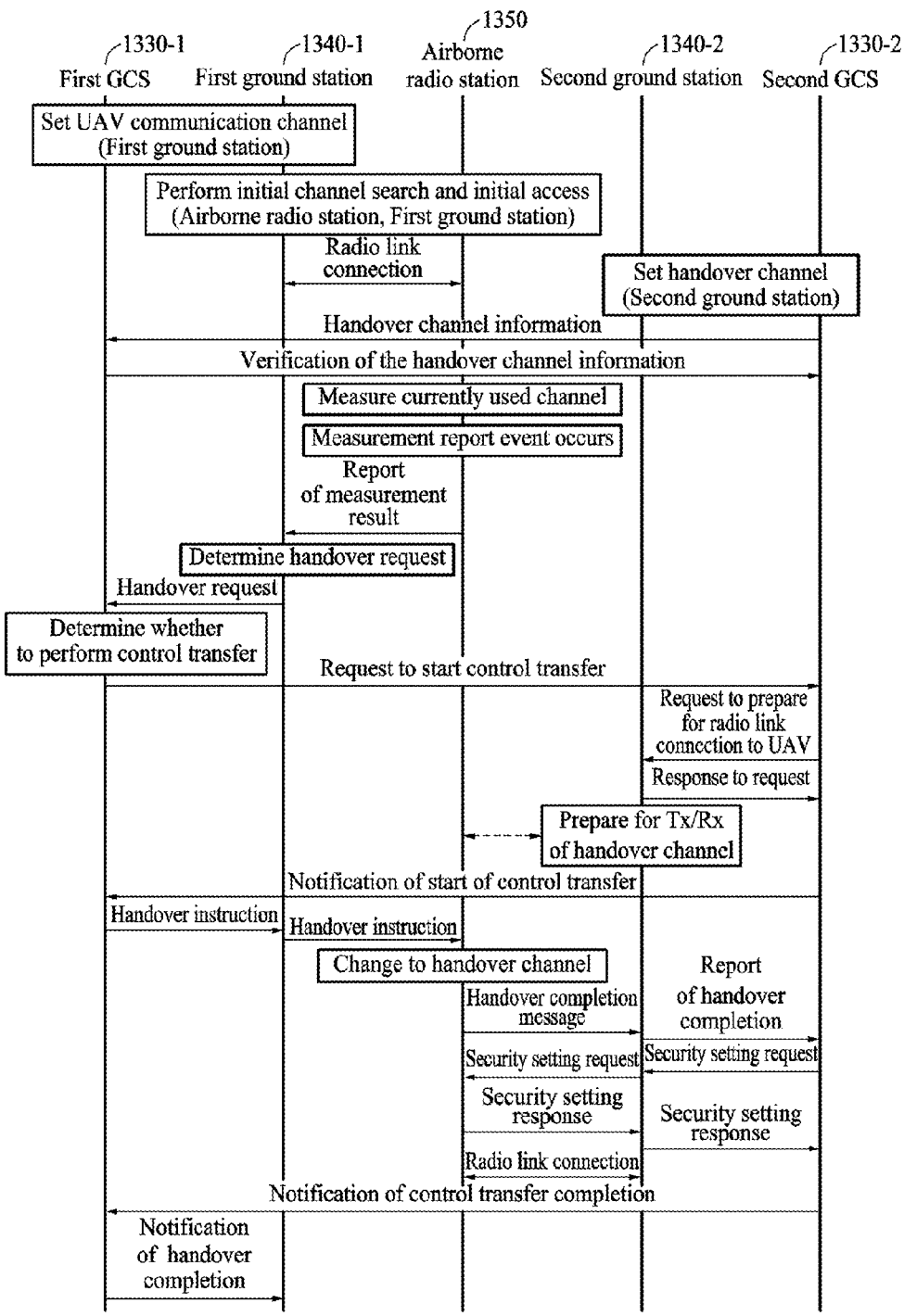
FIG. 13 is a diagram illustrating another example in which a GCS performs a control transfer according to an example embodiment.

FIG. 13 illustrates another example in which a GCS performs a control transfer according to an example embodiment.

Referring to FIG. 13, a UAV CNPC system may include a first GCS 1330-1, a second GCS 1330-2, a first ground station 1340-1, a second ground station 1340-2 and an airborne radio station 1350. Configurations and operations of the first GCS 1330-1, the second GCS 1330-2, the first ground station 1340-1, the second ground station 1340-2 and the airborne radio station 1350 may be substantially the same as those of the first GCS 1230-1, the second GCS 1230-2, the first ground station 1240-1, the second ground station 1240-2 and the airborne radio station 1250 of FIG. 12.

When the first GCS 1330-1 and the second GCS 1330-2 do not share security settings, the airborne radio station 1350 and the second ground station 1340-2 may not apply security to a handover completion message that is transmitted immediately after a handover completes.

In response to the handover completion message being received, the second GCS 1330-2 may send a security setting request to the airborne radio station 1350 through the second ground station 1340-2. In response to the security setting request, the airborne radio station 1350 may transmit a security setting response to the second GCS 1330-2 through the second ground station 1340-2.

Figure 14:
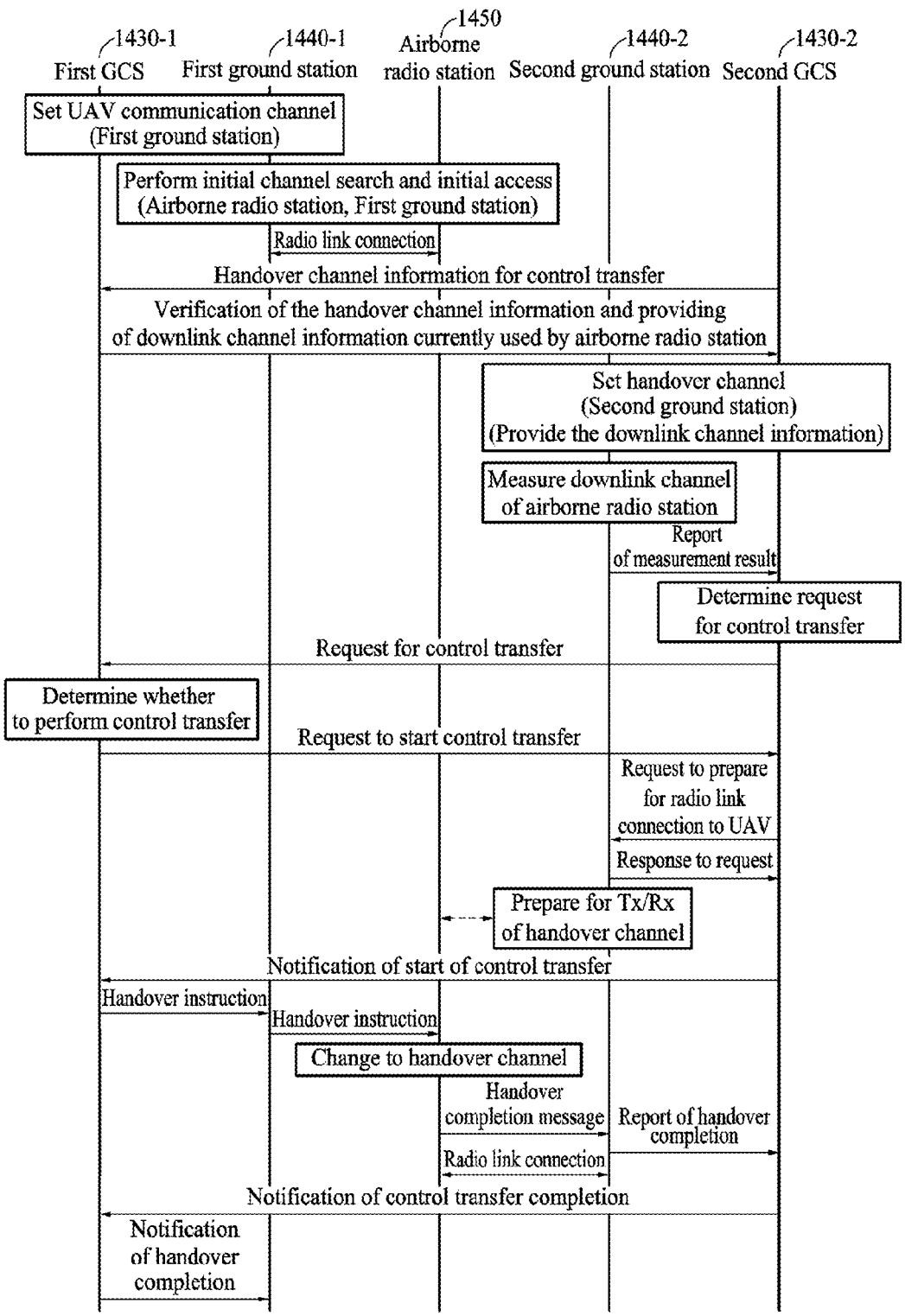
FIG. 14 is a diagram illustrating still another example in which a GCS performs a control transfer according to an example embodiment.

FIG. 14 illustrates still another example in which a GCS performs a control transfer according to an example embodiment.

Referring to FIG. 14, a UAV CNPC system may include a first GCS 1430-1, a second GCS 1430-2, a first ground station 1440-1, a second ground station 1440-2 and an airborne radio station 1450. Configurations and operations of the first GCS 1430-1, the second GCS 1430-2, the first ground station 1440-1, the second ground station 1440-2 and the airborne radio station 1450 may be substantially the same as those of the first GCS 1230-1, the second GCS 1230-2, the first ground station 1240-1, the second ground station 1240-2 and the airborne radio station 1250 of FIG. 12.

The second GCS 1430-2 may send a request to start a control transfer to the first GCS 1430-1 based on a measurement result of the second ground station 1440-2.

The first GCS 1430-1 may send a channel request to an SA, and may receive an assigned channel from the SA. The first ground station 1440-1 and the airborne radio station 1450 may be connected using the assigned channel.

The second GCS 1430-2 may request the SA to assign a control transfer channel of a UAV, and may receive the assigned control transfer channel from the SA. The second GCS 1430-2 may set the control transfer channel to the second ground station 1440-2, and may provide the first GCS 1430-1 with information about the control transfer channel.

The first GCS 1430-1 may transfer, to the second GCS 1430-2, a response to the provided information and downlink channel information that is currently used by the airborne radio station 1450. The second GCS 1430-2 may provide the downlink channel information to the second ground station 1440-2. The second ground station 1440-2 may measure a downlink channel of the airborne radio station 1450 based on the downlink channel information.

The second ground station 1440-2 may measure the downlink channel of the airborne radio station 1450. The second ground station 1440-2 may measure an RSSI to measure the downlink channel. When the RSSI is greater than or equal to a reference value, the second ground station 1440-2 may report a measurement result to the second GCS 1430-2. The second ground station 1440-2 may periodically report the measurement result when the RSSI is greater than or equal to the reference value, as described above in FIG. 3.

The second GCS 1430-2 may determine a request to start a control transfer based on the measurement result, and may request the first GCS 1430-1 to start the control transfer.

The first GCS 1430-1 may determine whether to perform the control transfer, in response to the request to start the control transfer, and may send a request to start a control transfer process to the second GCS 1430-2.

The second GCS 1430-2 may send a request to prepare for a radio link connection to the airborne radio station 1450 to the second ground station 1440-2, and may receive a response to the request from the second ground station 1440-2. Also, the second GCS 1430-2 may transmit, to the first GCS 1430-1, a notification message associated with the request to start the control transfer process. In response to the request to prepare for the radio link connection, the second ground station 1440-2 may perform Tx and Rx settings for the handover channel, and may prepare for the radio link connection to the airborne radio station 1450.

The first GCS 1430-1 may transfer a handover instruction to the airborne radio station 1450 through the first ground station 1440-1. The airborne radio station 1450 may perform a handover from a currently used channel to the handover channel, and may transmit a handover completion message to the second ground station 1440-2. When the handover completion message is received, the second ground station 1440-2 may report a handover completion to the second GCS 1430-2. When a report of the handover completion is received, the second GCS 1430-2 may notify the first GCS 1430-1 of a completion of the control transfer. In response to the completion of the control transfer, the first GCS 1430-1 may notify the first ground station 1440-1 of the handover completion. The first ground station 1440-1 may terminate Tx and Rx with the airborne radio station 1450.

In the control transfer process, the first GCS 1430-1 may transfer, to the second GCS 1430-2, the request to start the control transfer, together with security-related setting information that is currently applied between the first ground station 1440-1 and the airborne radio station 1450.

The second GCS 1430-2 may update a security key based on the security-related setting information. The security key may be used for a radio link connection between the second ground station 1440-2 and the airborne radio station 1450. The second GCS 1430-2 may provide the second ground station 1440-2 with the updated security key together with a request to prepare for a radio link connection to the airborne radio station 1450. Also, when the second GCS 1430-2 notifies the first GCS 1430-1 of the start of the control transfer, security setting information that is to be used by the second ground station 1440-2 and the airborne radio station 1450 may be provided. The airborne radio station 1450 may set security based on the provided security setting information. The first GCS 1430-1 may include the security setting information in a handover instruction and may provide the handover instruction with the security setting information to the airborne radio station 1450.

When the first GCS 1430-1 and the second GCS 1430-2 do not share security settings, the airborne radio station 1450 and the second ground station 1440-2 may not apply security to a handover completion message that is transmitted immediately after a handover completes.

Operations performed after the second GCS 1430-2 receives the handover completion message from the second ground station 1440-2 may be the same as those of FIG. 13.

The above-described configurations may be used for a handover of a UAV control communication that may be performed during an operation of a UAV, and for a control transfer between GCSs that control the UAV. Also, the above-described configurations may be applicable to P2P type and P2MP type UAV CNPC systems. For example, when the above-described configurations are applied to the P2MP type UAV CNPC system, a plurality of UAVs may be simultaneously supported.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The components described in the example embodiments may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A handover method of performing an inter-cell handover between a first ground station and a second ground station in a communication system where channels are dynamically assigned and managed, the handover method comprising:

setting an unmanned aerial vehicle (UAV) communication channel to the first ground station and an airborne radio station for a radio link connection;

setting a handover channel to the second ground station and the airborne radio station;

measuring, by the airborne radio station, a signal quality of the UAV communication channel and reporting a measurement result to the first ground station;

sending, by the first ground station, a handover request to at least one of a ground control station (GCS) or a control and non-payload communication (CNPC) network;

determining, by the at least one of the GCS or the CNPC network, whether to perform a handover based on the measurement result; and transmitting, by the at least one of the GCS or the CNPC network, a handover instruction to the airborne radio station based on a result of the determining whether to perform a handover, wherein the airborne radio station uses a measurement signal, transmitted by the at least one of the GCS or the CNPC network to the airborne radio station through the second ground station, for measuring the handover channel, and wherein the transmission of the measurement signal is requested by at least one of the airborne radio station or the second ground station.

2. The handover method of claim 1, wherein the measuring comprises reporting the measurement result when the signal quality of the UAV communication channel is less than or equal to a reference value.

3. The handover method of claim 1, wherein the transmitting of the handover instruction comprises:

sending, by the at least one of the GCS or the CNPC network, a handover request to the second ground station based on the result of the determining;

responding, by the second ground station, to the handover request; and transmitting, by the at least one of the GCS or the CNPC network, the handover instruction to the airborne radio station based on a response of the second ground station.

4. The handover method of claim 3, wherein the sending of the handover request to the second ground station comprises providing, by the at least one of the GCS or the CNPC network, security setting information that is to be used for a communication between the second ground station and the airborne radio station.

5. The handover method of claim 4, further comprising:
performing the communication between the second ground station and the airborne radio station based on the security setting information.

6. The handover method of claim 1, further comprising:
performing, by the airborne radio station, a handover to the handover channel based on the handover instruction, and reporting a completion of the handover to the at least one of the GCS or the CNPC network.

7. The handover method of claim 6, wherein the performing of the handover to the handover channel comprises:

transmitting, by the at least one of the GCS or the CNPC network, control communication data to the airborne radio station; and performing, by the airborne radio station, the handover to the handover channel based on the control communication data.

8. The handover method of claim 3, further comprising:

transmitting, by the at least one of the GCS or the CNPC network, information required for synchronization acquisition to the second ground station when the at least one of the GCS or the CNPC network sends the handover request to the second ground station; and performing, by the airborne radio station, a handover based on the information required for synchronization acquisition.

9. The handover method of claim 1, wherein the measuring comprises measuring, by the airborne radio station, a signal quality of the handover channel and reporting the measurement result when the signal quality of the handover channel is greater than the signal quality of the UAV communication channel.

10. The handover method of claim 1, wherein the transmitting of the measurement signal comprises:

sending, by the at least one of the GCS or the CNPC network to the second ground station, a transmission time determination request to determine a transmission time at which the measurement signal is to be transmitted; and determining, by the second ground station, the transmission of the measurement signal in response to the transmission time determination request.

11. The handover method of claim 10, wherein the determining of the transmission of the measurement signal comprises determining, by the second ground station, the transmission of the measurement signal based on downlink channel information of the airborne radio station.

12. The handover method of claim 1, wherein the transmitting of the measurement signal comprises:

sending, by the at least one of the GCS or the CNPC network to the airborne radio station, a transmission time determination request to determine a transmission time at which the measurement signal is to be transmitted; and determining, by the airborne radio station, the transmission of the measurement signal in response to the transmission time determination request.

13. The handover method of claim 12, wherein the determining of the transmission of the measurement signal comprises determining the transmission of the measurement signal based on global navigation satellite system (GNSS) position information of the airborne radio station or a received signal strength indicator (RSSI) of the first ground station.

* * * * *